United States Patent [19]
Beller

[11] Patent Number: 5,852,819
[45] Date of Patent: Dec. 22, 1998

[54] FLEXIBLE, MODULAR ELECTRONIC ELEMENT PATTERNING METHOD AND APPARATUS FOR COMPILING, PROCESSING, TRANSMITTING, AND REPORTING DATA AND INFORMATION

[76] Inventor: Stephen E. Beller, 130 Hastings Ave., Croton on Hudson, N.Y. 10520

[21] Appl. No.: 790,549

[22] Filed: Jan. 30, 1997

[51] Int. Cl.⁶ .................................................. G06F 17/30
[52] U.S. Cl. .............................................. 707/1; 707/101
[58] Field of Search ........................ 707/1–10, 100–104, 707/200–206; 701/208, 213, 215, 207; 345/507, 326, 333, 334; 364/420, 489, 488, 490, 491

[56] References Cited

U.S. PATENT DOCUMENTS

| | | | |
|---|---|---|---|
| 5,343,554 | 8/1994 | Koza et al. | 395/13 |
| 5,497,334 | 3/1996 | Russell et al. | 364/489 |
| 5,596,494 | 1/1997 | Kuo | 364/420 |
| 5,600,844 | 2/1997 | Shaw et al. | 345/507 |
| 5,680,557 | 10/1997 | Karamchetty | 345/334 |
| 5,689,431 | 11/1997 | Rudow et al. | 701/213 |

*Primary Examiner*—Thomas G. Black
*Assistant Examiner*—Buay Lian Ho

[57] ABSTRACT

A method and apparatus for compiling(acquiring and storing), processing (analyzing, integrating, and organizing), transmitting, and reporting data and information, which is comprised of a flexible, modular system that overcomes major limitations of conventional and multidimensional databases. The method and apparatus utilizes computer programming code modules and modules of logically arranged digital signal function and formula formations to :(a) acquire data/information units using modules of query instruction items and response instruction items, which can be presented via a branching-logic process, (b))store the responses to the items in independent record files and internal database files, (c)integrate them with digital signals stored in other sources via an integration file, (d)process the digital signals in the digital signal processing files, (e) produce portable report files, and (f)generate reports utilizing report format tiles.

19 Claims, 7 Drawing Sheets

APPARATUS 1

FLEXIBLE, MODULAR ELECTRONIC ELEMENT PATTERNING METHOD AND APPARATUS FOR COMPILING, PROCESSING, TRANSMITTING, AND REPORTING DATA AND INFORMATION

BACKGROUND

1. Field of Invention

This invention relates to the management of data and information using a flexible, modular electronic element patterning method and apparatus. In the present invention the term "data" refers to alphanumeric values, text, and other physical and mental symbols representing measures, classifications, and other descriptions of objects, forces, behaviors, concepts, beliefs, emotions, and other phenomena (occurrences, events, circumstances). Independent units of data do not, in and of themselves, convey intelligible/meaningful (understandable, comprehensible, significant, denotative) information; but when they are combined with certain other data, they can form intelligible/meaningful patterns of information. In the present invention, therefore, the term "information" refers to data that have been formed into intelligible/meaningful patterns. These informational patterns can be expressed (stated, manifested, indicated) as:

(a) statistical representations of data relationships (e.g., descriptives of central tendency and dispersion, ANOVAS, correlations, regressions, nonparametic tests, modeling statistics, and continuous, discrete, and non-central distributions);

(b) graphical representations of data relationships (e.g., categorical charts, SQC charts, histograms, and scatterplots, caseplots, time-series plots, normal probability plots, and cross-correlation function plots);

(c) visual or auditory signals and signs indicating the existence or absence of specific data relationship conditions, such as using colors, alphanumeric symbols, pictures, or sounds to indicate whether certain data have met specified criterion conditions represented by other data, (e.g., a buzzer sounding on a smoke detector when data from the detector's sensor, which represents the current smoke level, is greater than other data in the detector's memory, which represents a criterion indicative of a safe level of smoke);

(d) visual or auditory signals and signs which identify an entity (a thing, occurrence, etc.) represented by a datum (a single data unit), such as using a series of words (i.e., strings of alphanumeric data symbols) to describe what another datum means (e.g., placing the datum "44" adjacent to the alphanumeric symbol/words "=the person's years of age", thereby conveying the information "the person is 44 years old"); and (e) other visual, auditory, and other suitable representations of other meaningful data relationships.

While information is comprised of intelligible/meaningful data patterns, information can be organized (e.g., categorized, indexed) into intelligible/meaningful patterns to produce useful knowledge. In the present invention, data and information are represented by electronic elements (digital signals). The method and apparatus of the present invention compiles, integrates, and transmits electronic elements of data and information from a multitude of sources, arranges them into electronic element patterns, and utilizes these patterns to generates intelligible/meaningful reports, indicative of the data and information, for enhanced knowledge.

In the fields of science, healthcare, criminal justice, education, human resources, financial forecasting, governmental management, political analysis, and other fields and industries where the management complex data and information is essential, there is need for a more flexible and efficient means by which to compile (i.e., acquire and store), process (i.e., integrate, organize, and analyze), and report useful data and information to the end user.

2. Description of Prior Art

Currently, relational and non-relational databases and database management systems for mainframes, servers, and personal computer (hereinafter referred to as "conventional databases") are widely used for the compilation, organization, and analysis of complex electronic data, and for the reporting of information. Conventional databases include, but are not limited to: DB2 (by IBM Corp.), CA-IDMS (by Computer Associates Corp.), Informix Online, SQL and 4GL (by Informix Software Inc.), Oracle 7 RDBMS (by Oracle Corp.), Sybase SQL Server and IQ (by Sybase Inc.), Alpha Five 2 (by Alpha Corp.), DataEase (by DataEase International Inc.), DBExpert (by Designer Software Inc.), FileMaker Pro (by Claris Corp.), Approach (by Lotus Development Corp.), Microsoft SQL Server, Access and FoxPro (by Microsoft Corp.), Paradox (by Borland International Inc.), R:BASE (by Microrim Inc.), and Salsa for the Desktop (by Wall Data). While such databases can obtain, store, organize, and report large quantities of data, they have inherent limitations which restrict their usefulness and efficiency. The present invention overcomes major limitations of conventional databases by providing a more flexible and efficient method and apparatus by which to manage the electronic element patterns comprising data and information.

One limitation of conventional databases involves the data input process. It can be difficult to program branching logic algorithms (an algorithm is a set of step-by-step procedural computer instructions, which may be comprised of programming code written in any suitable machine language object code, assembly, and high-level language source code, software application macros, and software application functions and formulas that perform decision-making, action-taking, and value-returning operations) to facilitate entry of raw (unprocessed) data into a conventional database. Branching logic instructs a computer to request the entry of specific data depending upon certain prior data that was entered. This branching process navigates data entry requests so that only data relevant to specific conditions are requested. For example, if a response to a request for data concerning a person's marital status indicates the person was never married, then branching logic would instruct the computer to skip a subsequent request for data about the date of marriage. In conventional databases, utilizing branching logic can require complex, multiple step programming procedures at each data entry point for which navigational branching is to be activated.

Another set of limitations of conventional databases are a result of their strict structural parameters. In both personal computer (PC) computer network servers and mainframe computer databases, all data must be organized into highly structured, inflexible arrays (matrix-like data patterns). In the terminology of PC and server databases (mainframe computer databases may use somewhat different terminology), all database arrays are comprised of fields (columns) and records (rows), and each complete array must be configured as a complete table (a collection of fields and records about a specific topic). These structural requirements substantially restrict the flexibility and efficiency of electronic element storage and patterning resulting in the following database limitations:

In a "normalized" database, different fields (which may have different amounts of records in each) are stored in their own tables. The tables may then be "joined" (electronically linked or interconnected, using an index consisting of a common field or "primary key" to match records across tables), which enables the relationship between the fields in different tables to be analyzed. This use of tables saves storage space by allowing the fields and their records to appear only once in the database, but analysis time is increased since relational joins are an exhaustive process. That is, analyzing records in joined tables requires that each record be matched against every other record in every table.

In a "denormalized" database, on the other hand, all tables are combined into a single table, which avoids time consuming analysis of joins, but creates other disadvantages. One limitation of denormalized databases is that they can produce extremely large tables since all fields are in a single table. Performing analyses with large denormalized databases can be very time consuming because many more disk I/Os (i.e., transferring data into and out of a storage device when memory is exhausted) and processing time are required since the entire database must be scanned, as opposed to scanning only the relevant tables of a normalized database.

Regardless of whether normalized or denormalized databases are used, each record in a table must have the exact same fields, even if certain records have empty fields (they lack information and/or data). The sparseness (emptiness) increases the database size with wasted space, which negatively impacts performance without adding additional data.

The type of data stored in each database field must be precisely defined (e.g., as being currency, date/time, text, numbers, and visual or auditory objects). Once defined, no data other than those conforming with the defined type are accepted by the database. This can cause problems if the end user wants to enter multiple types of data in a specific field.

There is considerable "overhead" in a database's data "file" (a file the primary unit of digital signal storage in a computer, which enables the CPU to distinguish between one collection of data and information from another). That is, mixed in with the raw data are computer-read symbols which are required to maintain the database's structural and functional integrity, but which increases the size, complexity and instability of the database without adding useful information and/or data.

Records and tables are neither independent nor portable. That is, records cannot be separated from nor stored independently of the tables in which they reside and tables cannot be separated from nor stored independently of the database file in which they reside. Thus, an individual record or table cannot be transported (moved) to another computer disk (or other storage device) without transporting the entire database file. This limitation means that if the data and information an end user must access is contained in a single record in a specific database table, the end user must have access to the entire database file, which requires having a copy of the entire file on the end user's own computer or using a LAN or WAN to access the file. A more efficient alternative is to simply store the individual record on the end user's PC, independently of all the other records, and to utilize a report generation program to produce a report utilizing the contents of that record.

To exemplify the greater efficiency afforded by using independent, portable records, consider that a single record with five fields stored independently as an ASCII delimited file is approximately 4,300 times smaller than the same record stored as the only record in a Microsoft Access database file. If a Microsoft Excel spreadsheet file is used to generate a simple report based on the aforedescribed record and the Microsoft Access database is set up with a similar report function, then the former is over 8 times smaller than the latter. Furthermore, since the size of a conventional database increases with the number of records (e.g., by increasing the aforedescribed Access database file from 1 record to 5,000 records, the database file increases in size by over 29 times), it is often not sensible to store large database files on an individual PC; instead, network access is required to retrieve a single record. Thus, using an independent, portable file to store a single record and using a separate report generator to produce a report from that record is substantially more efficient because they save much storage space and, by being easily stored in a PC, they can eliminate the necessity of continual network access.

Another limitation of conventional databases is the scope of computational analyses they can perform on data. Specifically, they can compute only the sum, average, count (frequency), minimum, maximum, variance, and standard deviation, and perform simple arithmetic computations of the data sets they contain. They are not designed, for example, to perform statistical computations such as correlational analyses and analysis of variance or to make forecasting ("what-if") analyses.

A further limitation of conventional databases is their weakness in dealing with certain aspects of historical (i.e., longitudinal) data. Since they typically keep only one version of the database at any one time, it can be difficult for a user needs to examine previous database states or check data trends over time.

Furthermore, the flexibility of conventional databases' report generation functions are limited by their failure to utilize easily designed and readily modifiable algorithms for precise control of the content and appearance a report.

Now that some of the limitations of conventional databases have been discussed, attention is turned to "On-Line Analytical Processors" (OLAPs), which attempt to overcome some of the shortcomings of conventional databases by using "multidimensional database" structures. OLAP multidimensional database tools include: Acuity/ESAcuity (by Management Systems), Acumen (by Enterprise SolutionKenan Systems), Advance for Windows (by Lighten, Inc), Clementine (by Integral Solutions Ltd), Commander OLAP (by Comshare), CorVu (by CorVu/Information Services), DecisionSuite Server (by Information Advantage), CrossTarget (by Dimensional Insight Inc), Delta Solutions (by MIS AG), DSS Agent (by MicroStrategy), DynamiCube OCX (by Data Dynamics, Ltd), EKS/Empower (by Metapraxis), Essbase (by Arbor Software Corporation), Gentia (by Planning Sciences), Holos (by Holistic Systems), Informix Hypercript Tools (by Informix), InfoAssistant (by Asymetrix), InfoBeacon (by Platinum Technology, Inc), IQ/Vision and DataVisionIQ (by Software Corp), macControl (by Breitschwerdt & Partners), Marketing Warehouse (by MSSI), Media (by Speedware Corporation), Oracle OLAP (by Oracle), PowerPlay (by Cognos, Inc.), Qbit (by Zenia Software, Inc), SAMAC MIT/400 (by Samac Pty Ltd), TM/1 (by Sinper Corp), Visualizer (by ASTRAC Ltd), and WIRED for OLAP (by AppSource Corporation).

Briefly, multidimensional database structures can be visualized as cubes of data within cubes of data (i.e., "hypercubes"). Each cube of data is comprised of "cells", which contains aggregated (consolidated, combined) data that relate elements along each dimension. Each side of the cube is a "dimension", which represents a different data category (typically time, measures, products, geographical regions, sales channels, etc.). In other words, multidimensional database structures typically arrange aggregated data elements into logically ordered layers of interconnected grids comprised of rows and columns.

Their multidimensional database structures enable OLAPs to enhance some of the capabilities of conventional databases. For example, OLAPs can:

(a) save storage space by reducing the size of indexes that are used to locate specific data and by not saving empty fields in records thereby reducing sparseness;

(b) improve performance because smaller indexes use up less memory;

(c) deal better with historical data by using time as a dimension for "time series" analysis of data; and (d) enhance data viewing via utilization of multidimensional scenarios, such as "pivoting" or "rotating" data (i.e., combining data in different ways, such as swapping columns and rows) and viewing hierarchical relationships between components (i.e., "members") of a dimension in a type of outline form.

OLAPs do not, however, address many of the limitations of conventional databases. For example, OLAPs:

(a) use only data in existing databases since they do not compile their own raw data;

(b) are subject to the structural confinements of the hypercube and thus their data elements lack independence and portability (including the inability to utilize independent record files); and (c) the flexibility of OLAPs' report generation functions are limited by their failure to utilize easily designed and readily modifiable algorithms for precise control of the report's content and appearance.

It should also be noted that "artificial intelligence" (AI) programs provide another method for analyzing data. Briefly, AI programs use data from conventional databases to build and maximize the accuracy of predictive models (i.e., mathematical models which predict trends based on existing data, etc.). They build and optimize the models via use of a "neural network", which is a mathematical structure that simulates human learning. Neural networks "learn" the complex higher order relationships between inputs (e.g., process conditions, materials attributes, etc.) and outputs (e.g., other process conditions, product attributes and quality) by repeatedly analyzing and readjusting defined models for increased accuracy. AI programs, while providing another mechanism for analyzing database contents, are not designed to overcome the aforedescribed limitations of conventional databases and OLAPs.

Objects and Advantages

Accordingly, the objects and advantages of the present invention involve overcoming the aforedescribed limitations of conventional and multidimensional databases through use of a flexible, modular electronic element patterning method and apparatus ("system"). Each of the modules utilized by the present invention is flexible, efficient and independent (i.e., able to be readily modified without disrupting the structure or content of the other modules). Specifically, the modules comprising the present invention are:

(a) data/information compilation modules utilizing computer programming code and branching logic to facilitate the acquisition and storage of data and information;

(b) record file modules comprised of independent record files for storing individual records as flexible, efficient electronic element patterns and internal database files for storing database records in tables;

(c) data/information processing and transmission modules utilizing computer programming code and logically arranged computer function and formula formations for analyzing, integrating, and organizing data and information into flexible, efficient electronic element patterns and transmitting them (i.e., sending them to different locations electronically);

(d) supplemental data/information modules containing reference information, and data from external databases; and (e) report generation modules utilizing computer programming code, logically arranged computer function and formula formations, and report format templates for producing and transmitting intelligible/meaningful reports reflecting the aforedescribed electronic element patterns.

Some of the ways that the present invention's radically new modular system provides more flexible and efficient management of data and information than capable with conventional and multidimensional databases are:

(a) large quantities of data can be compiled efficiently utilizing easy to use branching logic routines;

(b) there is no need to define the type of data and information in a field, so multiple types of data can be entered into a single field;

(c) each record containing the raw data does not need the same fields as any other record, thereby eliminating sparseness by storing in each record only those fields containing data;

(d) records can be stored independently of one another (i.e., they need not be associated with a table nor stored within a database file), thereby eliminating much of the overhead required for structural integrity in conventional and multidimensional databases;

(e) the data or information in any one field of any one record can be processed, independent of or in conjunction with the contents of any other field(s) of any other record(s), using any suitable algorithm, thereby providing unprecedented analytic capabilities;

(f) the algorithms which generate a report are stored independently of the raw and processed data and information and independently of the algorithms which process the data and information, thereby enabling continual modifications of the report generation algorithms without disrupting other system components;

(g) the algorithms which integrate information and/or data from a plurality of sources are stored independently of the information and/or data, thereby enabling continual modification of the algorithms without disrupting the raw and processed data and information; and (h) there are no inherent structural parameters, such as the relational database grid or OLAP multidimensional database structure, thereby affording exceptional flexibility of database design.

Still further objects and advantages will become apparent from a consideration of the ensuing descriptions and drawings.

DRAWING FIGURES

Figure 1:
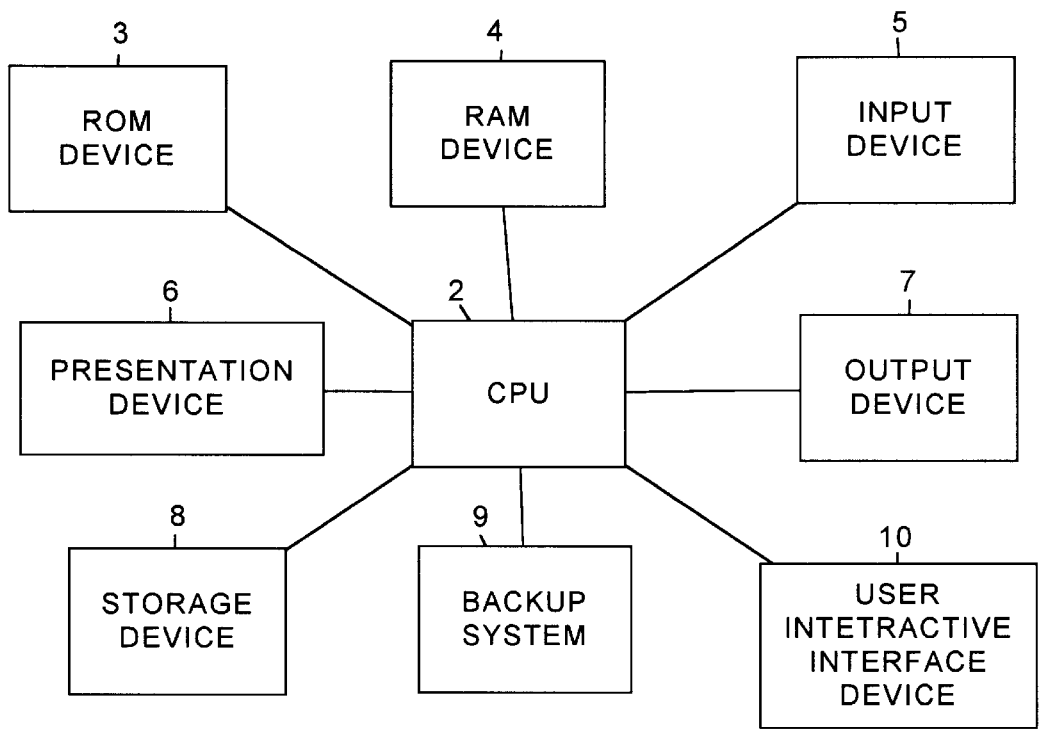
FIG. 1 illustrates a block diagram of the apparatus of the present invention.

| Reference Numerals In Drawings | |
|---|---|
| 1 Computer Apparatus | 60 Response Instruction Header (RIH) |
| 2 CPU | |
| 3 ROM device | 64 Response Instruction Code (RIC) |
| 4 RAM device | |
| 5 Input device | 68 Record file Module (RFM) |
| 6 Presentation device | 72 Response Instruction Identifier (RIID) |
| 7 Output device | |
| 8 Storage device | 76 Response Instruction Format Code (RIFC) |
| 9 Backup system | |
| 10 User interactive interface device | 78 Input Prompt Code (IPC) |
| | 80 Data Unit (DU) |
| 20 Data/Info Compilation Module (DCM) | 84 Direct Response (DR) |
| | 88 Passive Response (PR) |
| 24 Data/Info Compilation Code Module (DCCM) | 92 Response Validation Code (RVC) |
| 28 Query Module (QM) | 100 Internal Database File (IDF) |
| 30 Query Unit (QU) | 104 Table Record (TR) |
| 32 Query Item (QI) | 112 Branching Logic Code (BLC) |
| 36 Query Item Header (QIH) | 116 Branching Criteria (BC) |
| 40 Independent Record file (IRF) | 120 Branch-To Location (BTL) |
| | 124 Data/Info Processing Module (DPM) |
| 44 Query Item Identifier (QIID) | 128 Data/Info Processing Code Module (DPCM) |
| 48 Query Item Format Code (QIFC) | 132 Data/Info Processing Function/Formula Module (DPFM) |
| 52 Response Instruction Module (RIM) | |
| 54 Response Instruction Unit (RIU) | 136 Data/Info Retrieval and Processing File" (DRPF) |
| 56 Response Instruction Item (RII) | 140 Processed Data/Info File (PDF) |
| 146 Aggregate Data/Info Units (ADU) | 144 Extended Table Record (ETR) |
| | 164 Portable Report Data/Info File (PRDF) |
| 150 Supplemental Data/Info Module (SDM) | 168 Report Generation Code Module (RGCM) |
| 152 Reference Data/Info File (RDF) | 172 Report Generation Function/ Formula Module (RGFM) |
| 154 Data/Info Integration File (DIF) | 176 Report Format File (RFF) |
| 156 External Database Files (EDF) | |
| 160 Report Generation Module (RGM) | |

SUMMARY

The present invention provides a flexible, efficient electronic element patterning method and apparatus for compiling (acquiring and storing), processing (analyzing, integrating, and organizing), transmitting (sending digital signals to different locations), and reporting (outputting) data and information. The method and apparatus of the present invention overcomes major shortfalls of conventional and multidimensional databases.

The apparatus of the present invention is comprised of a digital computer system comprising a Central Processing Unit (CPU), Read Only Memory (ROM) device, Random Access Memory (RAM) device, input device, storage device, presentation device, backup system, and user interface and delivery device. These components enable the computer system to compile, process, transmit, and report information and/or data from one or a plurality of end users in one or a plurality of locations.

The method of the present invention comprises a process that compiles, processes, and reports data and information utilizing five distinct, yet related modules. Data/information compilation modules are comprised of electronic files containing computer algorithms, alphanumeric text, and visual and auditory "objects" (i.e., basic visual and auditory elements) in electronic form. The modules are utilized to acquire information and/or data efficiently using branching logic and to store them as digital signals in data/information file modules. The data/information file modules are comprised of efficient independent record files containing the information and/or data of a single entity and of internal database files containing the information and/or data of a plurality of entities. The independent record files provide an efficient means of storing and transmitting raw data and information. Supplemental modules comprised of reference files and external databases are utilized to augment the compiled information and/or data with additional data and information. Processing modules comprised of easily modifiable computer programming code, functions, and formulas are utilized to analyze, integrate, and organize the information and/or data. Report generation modules are comprised of files of data and information in efficient, easily transmitted digital signal formations and of report format files of easily modifiable computer programming code, functions, formulas, alphanumeric text, and visual and auditory electronic objects. The report format files are utilized in conjunction with the files of data and information formations to produce output reports. While each of the modules comprising the present invention is utilized with the other modules, each is structurally independent, thereby preventing modifications made in one module to disrupt the content and structure of the other modules.

Description—FIG. 1

FIG. 1 illustrates a block diagram of the apparatus of the present invention which is denoted generally by the reference numeral 1. The apparatus of the present invention is comprised of a Central Processing Unit (CPU) 2 which is utilized for obtaining, processing, and reporting at least one element (unit) of data and information. The CPU 2 may operate in a microprocessor, a microcomputer, a mainframe computer, a supercomputer system, or a molecular computer depending upon the application and the digital computer system employed.

The apparatus 1 is also comprised of a Read Only Memory (ROM) device 3 for the storage of the operational program data or codes which control the operation of the apparatus and which is further comprised of any additional software programs or codes which direct the apparatus 1 to perform the method utilized in the present invention. In this manner, the method of the present invention may be embodied solely as a computer and/or software program or codes. A Random Access Memory (RAM) device 4 is also utilized for storing the data and information, which will be described in more detail below. Note that any other suitable memory method may also be used such as PROM, EPROM, and "bubble memory". An input device 5 is utilized in the apparatus 1, which may be a keyboard, mouse, joy stick, optical scanner, electronic pen, modem, magnetic strip reader, LAN device, WAN device, touch screen, camera, touch pad, biologic measurement device, microphone, infrared device, ultrasound device or any other suitable means for entering data, information and user control commands into a digital computer system.

The apparatus 1 is also comprised of a user presentation device 6 for presenting information related to the operation of the present invention. In this respect, the operation of the apparatus 1 may be facilitated by the display of on-screen menus, the sounding of audio speakers, and any other suitable means which may allow a user, via the user input device 5, to select apparatus operations or in other ways exert control over the present invention. The presentation device 6 may also present requests for input information and/or data to the user in text, graphics, audio, video, multimedia, and any other suitable formats.

The apparatus 1 is further comprised of an output device 7 which may be or which may include a printer and plotter for generating output data and information such as hard copy reports, an amplifier and speaker for generating audio representations of the data and information, a modem or other suitable telecommunication means for electronically transmitting output data and information or report data and information to remote locations, and other suitable output means for presenting data and information. The presentation device 6 may also function as an output device 7 by displaying a visual, audio, and any other suitable presentation of output data and information.

The apparatus 1 is further comprise of storage device 8 which is comprised of a hard disk, floppy disk, compact disk, magneto-optical drive, tape drive, magnetic strip, or other suitable means is used for storage of data and information in digital form.

The apparatus 1 may also comprise a backup system 9 which is comprised of a CPU 2', a ROM device 3', a RAM device 4', and storage device 8', which are identical to the CPU 1, the RAM device 4, the ROM device 3, and storage device 8, respectively, described above. The backup system 9 serves as a redundancy system in the event of a failure or malfunction of any of their primary system counterparts (CPU 2, ROM device 3 and RAM device 4, and storage device 8, respectively). In this manner, duplicate files may be stored.

The apparatus 1 may also comprise a user interactive interface and delivery system 10. The user interactive interface and delivery system 10 may be a separate computer (not shown) which may contain ROM and RAM memory devices, data input and user command entry devices, which may include a keyboard, a mouse, and/or a modem or any other suitable device, and a data output device which may be a printer or any other suitable device for obtaining, receiving or storing data output reports. The user interactive interface and delivery system 10 is designed to be utilized by remote users and is further designed to be located at remote locations such as at the locations of the above described users. The user interactive interface and delivery device 10, may be interfaced with the apparatus 1 of the present invention either via telecommunication means and/or other suitable communication networks which may include direct communication link-ups and/or radio communication link-ups via transmitting and/or satellite communication systems or means.

The user interactive interface and delivery device 10 provides a means by which to allow a remote user, as defined above, to access the apparatus 1. This may allow for a direct transmission of data and information to be entered via any suitable data entry means located at the user's location. It should be noted that adequate precautions are to be taken so as to prevent a nonauthorized user from accessing the apparatus 1 and the data, information, or algorithms stored therein. Any informational reports, if desired, may be electronically transmitted to the user via the user interactive interface and delivery device 10 wherein the report or reports may be output via the output means (not shown), which may be a printer or other suitable output device, or wherein said report data may be stored in a user memory device.

Utilization of the user interactive interface and delivery system 10 in FIG. 1 may be accompanied by a security scheme or means whereby the user may be required to input a user password or access code in order to access the system and/or decrypt data and information that has been previously encrypted. Any other suitable security system may also be utilized to safeguard the apparatus 1 of the present invention as well as a user's files and/or other interests. The security scheme or means may also be provided to ensure security and confidentiality of data and information. Further, the device 10 allows for an expedited data and information entry process as the data and information may be entered directly and/or instantaneously into the apparatus 1.

Further, the apparatus 1 of the present invention may be adapted to service multiple users over multiple channels in a network environment such as in local area networks (LANS) as well as wide area networks (WANS) wherein the present invention may be utilized over communications and/or long distance communication lines or systems such as telephone networks (phone lines) and/or radio communication and/or satellite communication networks.

Further, the user interactive interface and delivery system 10 may be employed to allow a user access to unsecured databases, or portions thereof, which may be stored in the apparatus 1 or which may be used in association with the present invention. The user interactive interface and delivery device 10 therefore may also provide for a means by which the present invention may be utilized as an on-line database. In this manner it can be seen that the present invention, which may be utilized in conjunction with network systems described above, can be utilized for providing vast amounts and varieties of data and information.

The CPU 2 operates under the control of the system operational software which is stored in the ROM device 3 memory device. The operational software of the apparatus 1, as will be described in more detail below, provides for complete control over the operation of the method of the present invention. The operational software may be provided in any programming language (i.e., BASIC, FORTRAN, COBOL, PASCAL, VISUAL BASIC, VISUAL C++, and any other suitable programming language) or it may be implemented in assembly or assembler language for the particular microprocessor or CPU utilized, depending upon the digital computer or processor utilized as well as depending upon any of the specific application constraints.

The present invention is premised upon a user interactive scheme wherein data is input via the input device 5, into the apparatus 1 and processed so as to provide informational reports. The operation of the present invention will be described below with reference to FIGS. 2 through 7.

Operation—FIGS. 2 to 7

Figure 2:
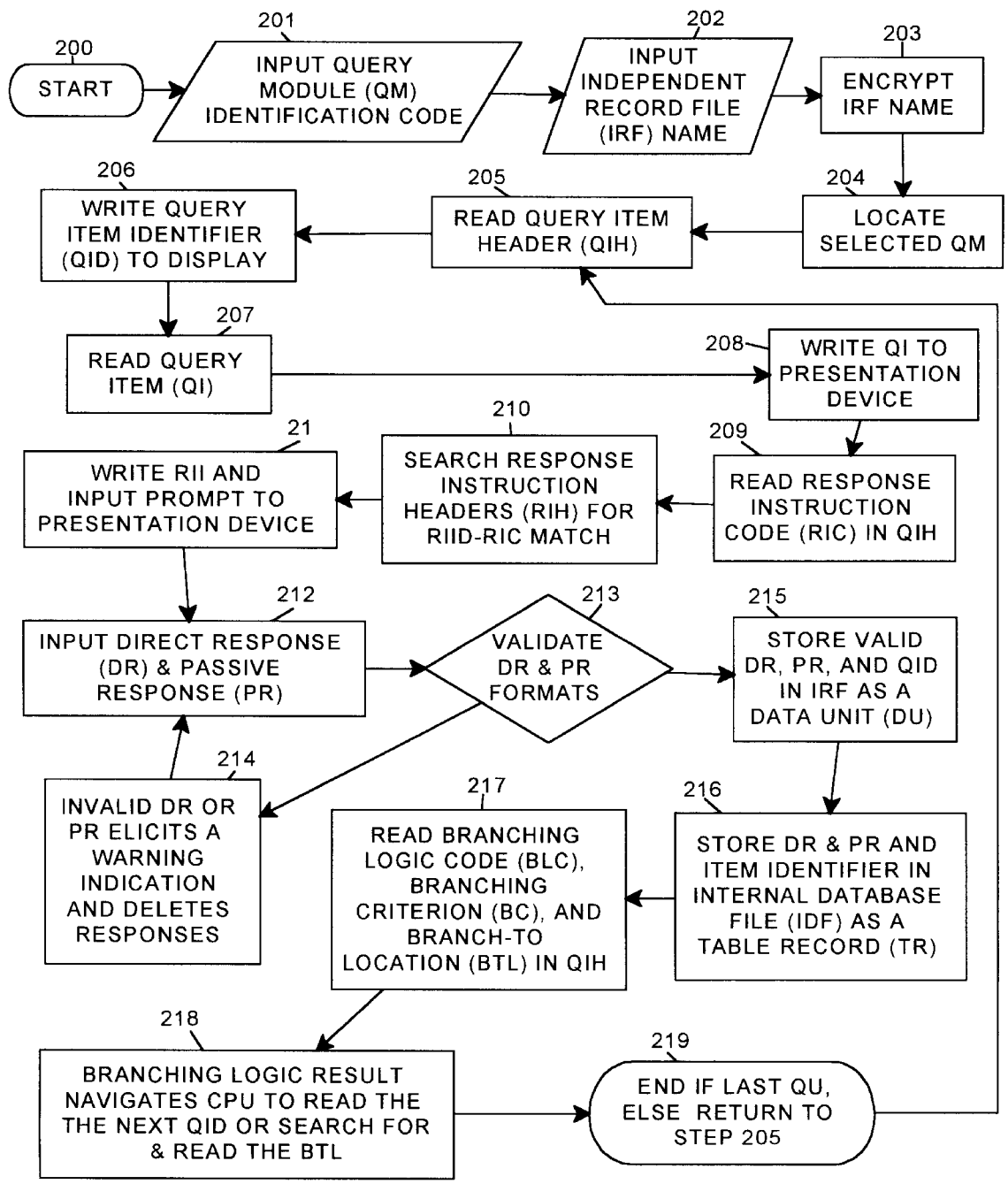
FIG. 2 illustrates an operational flow diagram of the data compilation steps of the data/information compilation method utilized in the present invention.

In the preferred embodiment of the present invention, an electronic "data/info compilation module" (DCM) 20 method is utilized to compile data and information of interest to the end user. In an alternate embodiment of the present invention, a nonelectronic DCM 20 method is utilized. FIG. 2 illustrates an operational flow diagram of the steps of the electronic DCM 20 method of the preferred embodiment. The alternate embodiment of the nonelectronic DCM 20 method will be described at a later point below. Note that the electronic and nonelectronic DCM 20 methods comprising the steps of FIG. 2 are optional since, as will also be described at a later point below, information and/or data compiled by means other than the DCM 20 method can be utilized in lieu of (as well as in addition to) data and information compiled via the DCM 20 method.

The electronic DCM 20 method is initiated by the user at step 200. At step 201, the identification code of an electronic "query module" (QM) 28, which is comprised of alphanumeric strings (series of letters, numerals, and the combination of letters and numerals) that indicate the specific QM 28 to be used, is input via the input device 5. To facilitate description of the electronic DCM 20 method, the components of the electronic QM 28 are described below.

Figure 3:
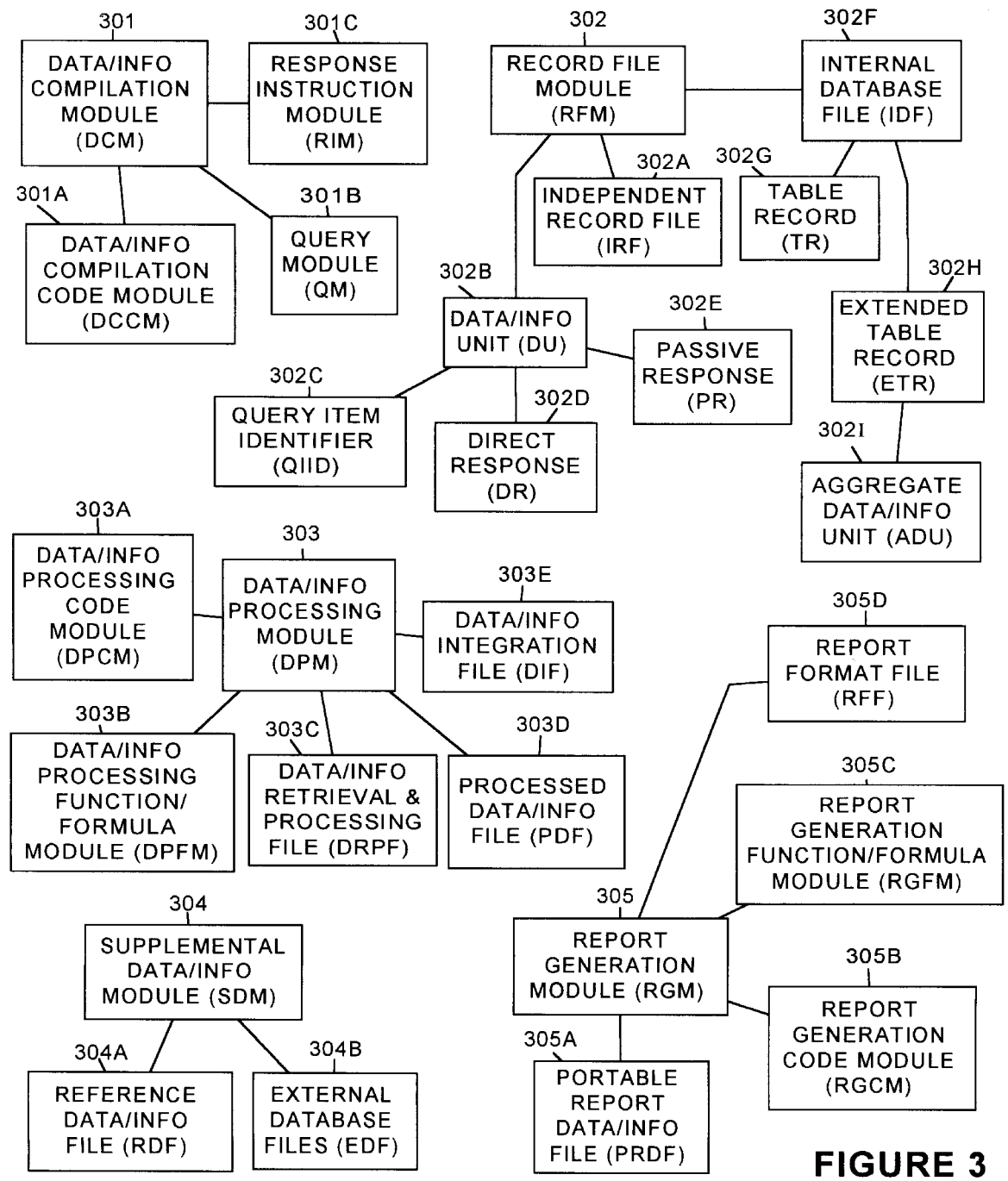
FIG. 3 illustrates a block diagram of the data/information compilation, record file, data/information processing, supplemental data/information, and report generation modules utilized in the present invention.

FIG. 3 illustrates a block diagram of the five basic module structures of the preferred embodiment of the present invention. The first module structures, at block 301, will now be described; the other four modules will be described in detail at a later point below. Note that each module utilized in the present invention is "independent", which means that modifications made to any one module does not disrupt the structure or content of any other module. Beginning at block 301, three sub-modules comprising the electronic DCM 20 are:

a "data/info compilation code module" (DCCM) 24, at block 301A;

the QM 28, at block 301B; and a "response-instruction module" (RIM) 52, at block 301C.

The DCCM 24 is comprised of one or a plurality of files containing programming code that operates the electronic DCM 20 program via instructions to the CPU 2. The programming code may be written in any suitable programming language. The electronic QM 28 may be comprised of one or a plurality of QMs 28. The components of electronic QM 28 are described in the block diagram of FIG. 4, beginning at block 401 and described below. Each electronic QM 28 is stored in the storage device 8 as digital signals in at least one file.

The electronic QM 28 is comprised of at least one "query unit" (QU) 30, indicated at block 401A. A series of QUs 30, of any quantity, may comprise the QM 28. Each QU 30 has two associated components, each of which are utilized by the CPU 2 via programming code of the DCCM 24. One component is a "query item" (QI) 32, indicated at block 401B. The QI 32, which is a question or other means of obtaining at least one element of information and/or data of interest to the end user, can be comprised of alphanumeric text, graphics, pictures, sound, video, and any other format suitable for presenting questions and other means of obtaining data and information on the presentation device 6. The other component of the QU 30 is a "query item header" (QIH) 36, indicated at block 401C. The QIH 36 is, itself, comprised of six components which are illustrated in the block diagram of FIG. 5.

Beginning at block 501, the components of the QIH 36 are identified:

(a) At block 501A is a "query item identifier" (QIID) 44 which is comprised of a unique alphanumeric string that identifies a particular QI 32.

(b) At block 501B is a "query item format code" (QIFC) 48 which indicates the mode of QI 32 presentation, that is, it indicates how the QI 32 is presented in the form of text, sound, graphics, pictures, video, and any other suitable form of QI 32 presentation (described in greater detail below).

(c) At block 501C is a "response instruction code" (RIC) 64 which is an alphanumeric string that indicates the type of response instruction associated with the QI 32 (described in greater detail below).

(d) At block 501D is a "branching logic code" (BLC) 112 which is an alphanumeric string that indicates the Boolean branching logic associated with the QI 32, which instructs the CPU 2 to branch to a particular QI 32 under specified conditions (described in greater detail below).

(e) At block 501E is a branching criterion (BC) 116 which is used in conjunction with the aforedescribed BLC 112 to define certain conditions of the branching operation (described in greater detail below).

(f) At block 501F is a "branch-to location" (BTL) 120 which is used in conjunction with the aforedescribed BLC 112 to define the destination of the branching operation (described in greater detail below).

Figure 4:
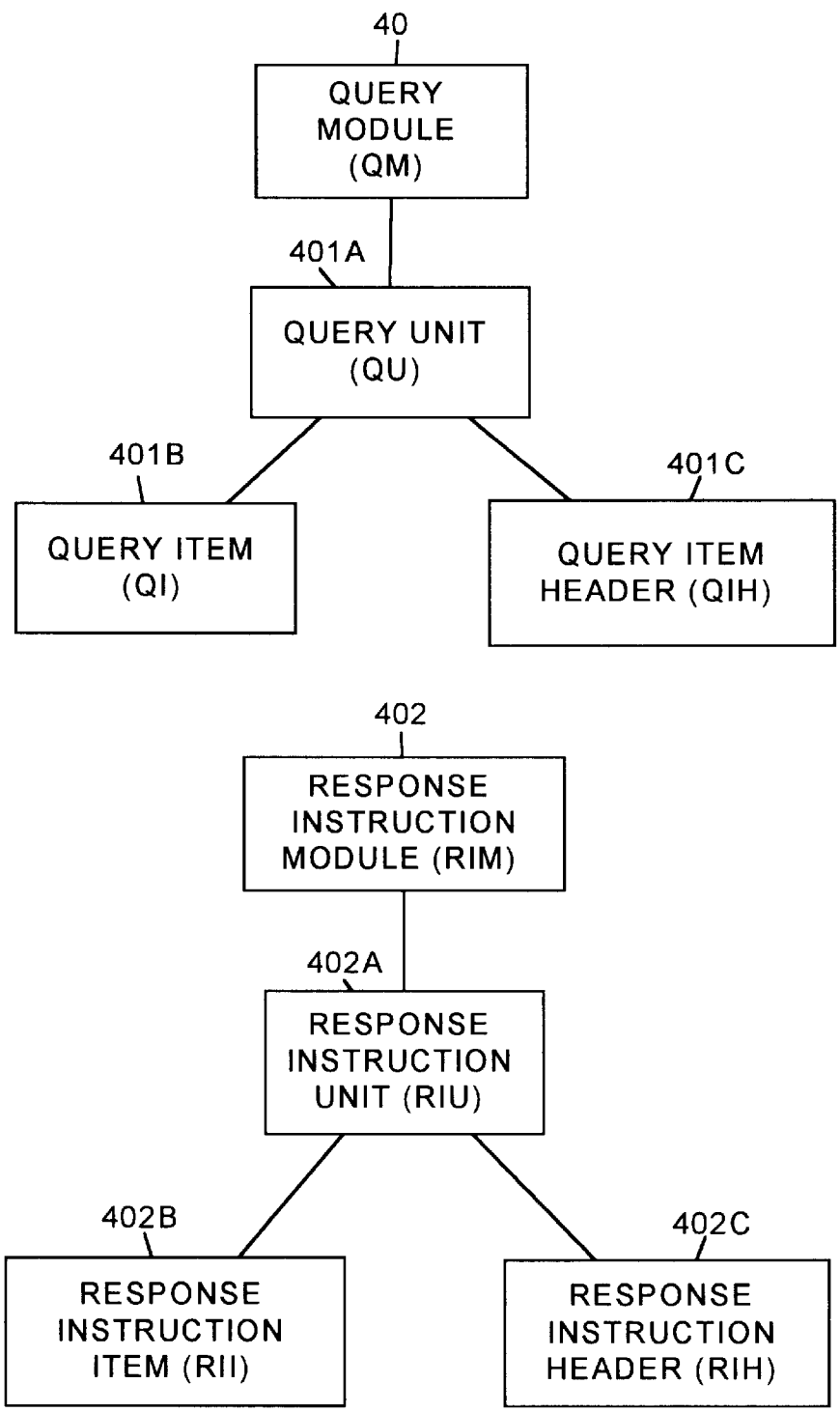
FIG. 4 illustrates a block diagram of the query and response instruction modules utilized in the present invention.
Figure 5:
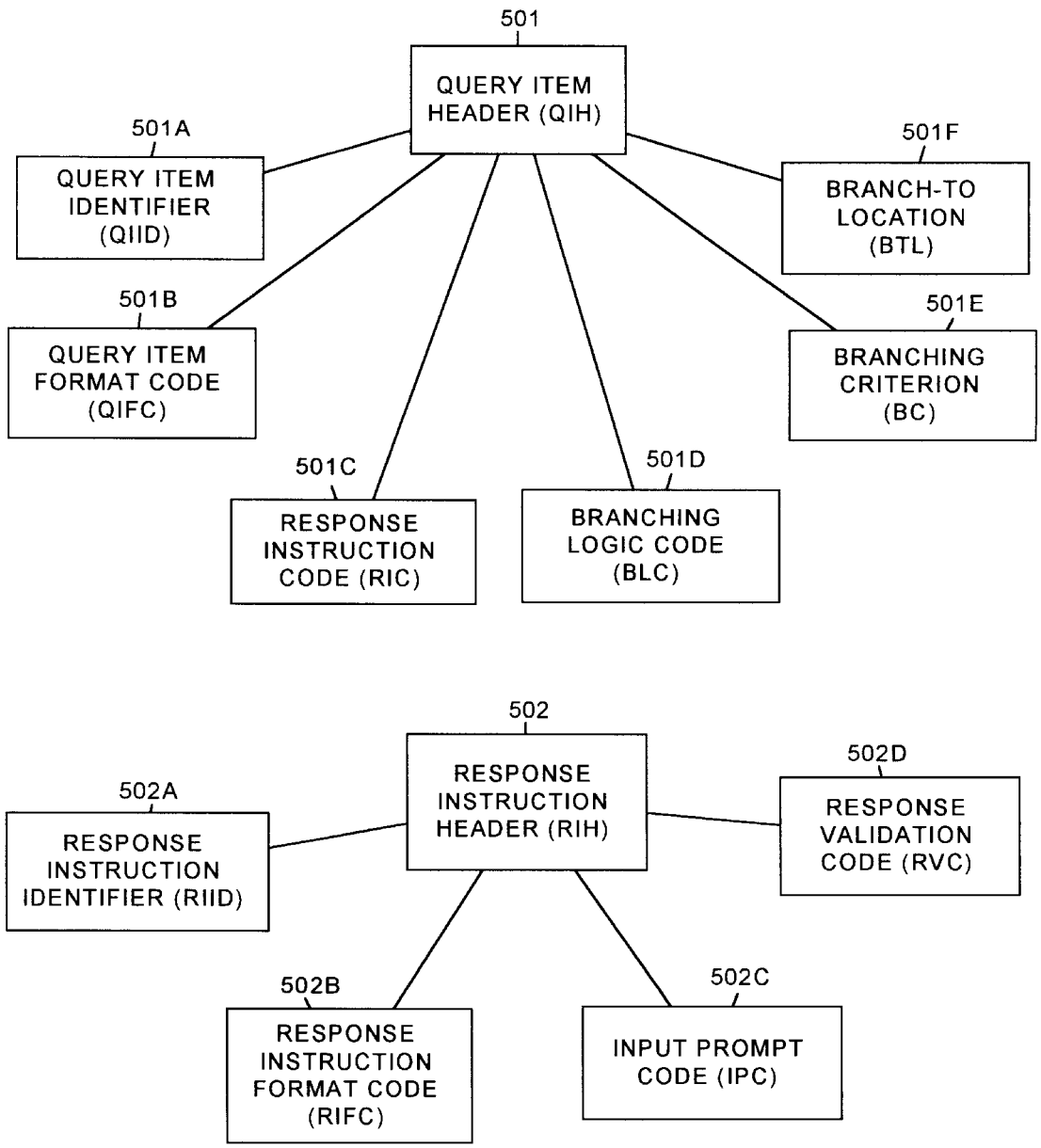
FIG. 5 illustrates a block diagram of the query and response instruction header code components of the method of the present invention.

Returning to FIG. 3, the RIM 52 is located at block 301C. There may be one or a plurality of RIMs 52 in the present invention. Components of the electronic RIM 52 are illustrated in FIG. 4, at block 402. At block 402A is a "response instruction unit" (RIU) 54. The RIU 54 has two components, each of which are used by the CPU 2 via programming code of the DCCM 24. One component of the RIU 54 is a "response instruction item" (RII) 56, indicated at block 402B. The RII 56 presents instructions relating to how the QI 32 is to be answered. The RII 56 may include alphanumeric rating scales (e.g., 1 through 9, true-false, yes-no, fill in the blank, multiple choice), visual objects (i.e., a digital pictures or videos), sound objects (i.e., digital sound recordings), or another suitable modes of responding to the QI 32 via the input device 5. Note that the RIU 54 may request multiple types of data, such as the use of a RII 56 scale instructing the end user to "Enter the number of months or 'DK' if you don't know." The other component of the RIU 54 is a "response-instruction header" (RIH) 60, at block 402C, which will be described in detail at a later point below.

Returning to FIG. 2, at step 202 the name of an "independent record file" (IRF) 40 is input via the input device 5. A "record" is a collection of related information and/or data that are treated as a single unit, thus, the IRF 40 is an electronic file containing a collection of related data that are treated as a unit. In the IRF 40, a unit of information and/or data may refer to a single "entity" (i.e., a person, company, organization, object, situation, event, and any other entity or occurrence). Returning to FIG. 3, one component of a "record file module" (RFM) 68 is the IRF 40, which are indicated at blocks 302, at block 302A, respectively. The other components of the RFM 68 are described in detail at a later point below.

The data and information in the IRF 40 are obtained via use of one or a plurality of electronic and/or nonelectronic QMs 28. If the same QM 28 is used on multiple occasions with the same entity, the data and information obtained from each subsequent QM 28 can either be appended to the previously acquired data and information in a single IRF 40 or they can be saved in new IRFs 40 in storage device 8. These data and information are stored in files in the storage device 8 as digital signals, in ASCII delimited or any other suitable format, by the CPU 2 via programming code of the DCCM 24.

Note that there are additional processes by which the IRF 40 can be constructed. One process involves transforming a record from "internal databases" (described later) and/or "external databases" (also described later) into the IRF 40. The specifics of this transformation process is detailed at a later point below.

A name given to the IRF 40 may be any string of alphanumeric symbols accepted by a computer's operating system (an operating system is comprised of the programming code that enable it to manage all of its internal tasks, functioning as the intermediary between software and hardware). If multiple IRFs 40 are created as a result of the aforedescribed repeated use of the same QM 28, each IRF 40 must have a different name, such as by changing the file name extension to indicate the number of times the same QM 28 was used. Note that the electronic data compilation method may be designed to enable input of the IRF 40 name to precede input of the QM 28 identification code.

Returning once again to FIG. 2, at step 203, which is an optional step, the name of the IRF 40 is encrypted by the CPU 2 via programming code of the DCCM 24, using any suitable computer algorithm that changes the name in such a manner that a decrypting algorithm is required to restore the original name. The purpose of this step is assure the confidentiality and security of the data within the IRF 40 by minimizing the possibility that the entity to which the IRF 40 refers can be identified by unauthorized persons. Note that any other suitable encryption-decryption methods may be utilized, at any suitable point during the method of the present invention, in addition to or in lieu of the aforedescribed file name encryption routine. The encrypted IRF 40 name may be presented by the presentation device 6 at any point while the electronic data compilation method is active or it may be withheld until verification from an authorized individual, such as via entry of a password.

At step 204 in FIG. 2 the CPU 2 searches the storage device 8, via programming code of the DCCM 24, and locates the electronic QM 28 whose identification code was input at Step 201. At step 205 the CPU 2 "reads" (i.e., puts into the RAM 4 and/or other suitable memory devices) the QIH 36 in "focus", via programming code of the DCCM 24. The term "focus" is used in the present invention to refer to the QI 32, QIH 36, RII 56, and RIH 60 currently targeted to be read or "written" (i.e., presented via the presentation device 6) by the CPU 2. That is, it refers to where the CPU 2 is focusing its operations. In the QM 28 with more than one QU 30, the DCCM 24 instructs the CPU 2 as to which specific item or header to focus upon.

At step 206, which is an optional step, the CPU 2 writes to the presentation device 6 the aforedescribed QIID 44 from the QIH 36 in focus, via programming code of the DCCM 24. At step 207, the CPU 2 reads the QI 32 that is associated with the QIH 36 in focus via programming code of the DCCM 24. At step 208, the CPU 2, via programming code of the DCCM 24, writes the QI 32 to presentation device 6 as indicated by the query item format code (QIFC) 48. The QIFC 48 may indicate that the CPU 2 write the QI 32 as text, sound, graphics, pictures, video, and any other suitable form presentation. The QIFC 48 may also instruct the CPU 2 to present the QI 32 for a fixed period of time, to present the QI 32 until it is responded to, to present the QI 32 sequentially in a plurality of formats or to present the QI 32 in any other suitable manner.

At step 209 the CPU 2 reads the response instruction code (RIC) 64 of the QIH 36 in focus via programming code of the DCCM 24. The RIC 64 is an alphanumeric string that indicates a specific response instruction unit (RIU) 54 associated with a particular QI 32. The RIU 54 was aforedescribed in FIG. 4 at block 402A as being the primary component of the response instruction module (RIM) 52. The components of the RIU 54, furthermore, are the aforedescribed response instruction item (RII) 56 at block 402B and the response instruction header (RIH) 60 at block 402C.

Returning to FIG. 5, the components of a RIH 60 are identified, beginning at block 502:

(a) At block 502A is a "response instruction identifier" (RIID) 72, which is comprised of a unique alphanumeric string that identifies a particular RII 56.

(b) At block 502B is a "response instruction format code" (RIFC) 76 which indicates the mode of RII 56 presentation, that is, it indicates how the RII 56 is presented in the form of text, sound, graphics, pictures, video, and any other suitable form of RII 56 presentation (described in greater detail below).

(c) At block 502C is an "input prompt code" (IPC) 78 which indicates the format of an input prompt, presented via the presentation device 6, which prompts the user for inputting a response to the QI 32. The IPC 78, together with programming code of the DCCM 24, instructs the CPU 2 to present a specific input prompt. The input prompt may be a visual cue, such as a line on the presentation device 6 upon which a response is typed on a keyboard via the input device 5; an auditory cue, such as a beeping sound presented by presentation device 6; and any other suitable cue for inputting a response.

(d) At block 502D is a "response validation code" (RVC) 92 which is an alphanumeric string that indicates whether the type of response to the QI 32 is acceptable (described in greater detail below).

Returning once again to FIG. 2, at step 210 the CPU 2, via programming code of the DCCM 24, searches each RIH 60 of each RIU 54 within the RIM 52 until it finds the RIID 72 that matches the RIC 64 of the QIH 36 in focus. At step 21, the RII 56 and the IPC 78 that are associated with the RIID 72 matching the RIC 64 are written to the presentation device 6 by the CPU 2 via programming code of the DCCM 24. The mode of RII 56 presentation is determined by the RIFC 76 as aforedescribed. Note that the RII 56 may be presented while its associated QI 32 is presented, after a period of time following the presentation of the QI 32, or at any other suitable time. Also note that the duration of RII 56 presentation can be equal to, less than, or greater than the duration of the QI 32 presentation. Further note that a plurality of QIs 32 may be presented before a single RII 56 is presented.

In an alternate embodiment it is possible to bypass the aforedescribed steps 209 and 210 by combining the QI 32 with its RII 56, that is, presenting the QI 32 at step 208 that includes within it the response instructions. This involves merging the QI 32 with the RII 56 to form an extended QI 32 that contains both a query and response instruction. An example of this extended QI 32 is the presentation, at step 208, of the following: "What is your gender? Enter 'M' for Male or 'F' for Female". In this alternate embodiment the RIH 60 is comprised of the aforedescribed IPC 78 and RVC 92, but is not comprised of the aforedescribed RIID 72 and RIFC 76.

At step 212, a "direct response" (DR) 84 and "passive response" (PR) 88 are input into the CPU 2 by the user via input device 5. Returning to FIG. 3, the DR 84 at block 302D, the PR 88 at block 302E, and the QIID 44 at block 302C are illustrated as components of a "data/info unit" (DU) 80 at block 302B. The DU 80, which is a component of the RFM 68 illustrated at block 302, will now be described.

The DU 80 is the primary element of data and information in the present invention. It may be comprised of various types of responses to the QI 32. One type of response is the DR 84, which is an element of information and/or data input into the CPU 2 by the user via the input device 5 in response to the QI 32. Another type of response is the PR 88, which is an element of information and/or data input into the CPU 2 via the input device 5, which does not require direct input by the user. A few examples of PRs 88 are the length of time it took to enter the DR 84 in response to the QI 32, the current date and time and, if the computer is equipped with biological measurement equipment (such as biofeedback apparatus), the user's current heart rate, galvanic skin response, and other biologic measures. In the preferred embodiment of the present invention, one DR 84 that has been elicited by a QI 32 and the associated QIID 44 are the only required elements of the DU 80. The inclusion of PRs 88 is optional. In alternate embodiments, there may be one or a plurality of PRs 88 with no DR 84, there may be one or a plurality of QIs 32 that elicit PRs 88 (such as showing a person a provocative picture to elicit an autonomic response), there may be no QI 32 (such as collecting electrocardiogram readings on a resting patient), and there may be no QIID.

At step 213, each DR 84 and PR 88 of the DU 80 in focus is checked for their format validity by the CPU 2 via programming code of the DCCM 24. Returning again to FIG. 5 at block 502D, the aforedescribed response validation code (RVC) 92 is used by the CPU 2 to determine whether the DR 84 and PR 88 are in an acceptable format for each QI 32 with which it is associated. The RVC 92 is comprised of alphanumeric code that indicates the valid format of each DR 84 and PR 88. A validated DU 80 contains no invalid DR 84 and PR 88. An invalid DU 80 contains at least one DR 84 or PR 88 in an invalid format. For example, the RVC 92 associated with an QI 32 requesting a person's years of age, may indicate that the DR 84 greater than the criterion of 130 is invalid.

At step 214 the CPU 2, via programming code of the DCCM 24, notifies the user of an invalid response via the presentation device 6. The notification may be comprised of a visual, auditory, or other suitable cue, signal or sign. In addition, the CPU 2 deletes the invalid DR 84 and PR 88 from the RAM device 4 (and any other memory device utilized) and from any display device 6 in which it appears. The process then returns to step 212.

At step 215 the CPU 2, via programming code of the DCCM 24, stores each validated DU 80 as digital signals in at least one IRF 40. In the preferred embodiment of the present invention, the IRF 40 is structured in an ASCII delimited format with each data element (i.e., the QIID 44 and its associated DR 84 and/or PR 88) arranged adjacent to one another. In alternate embodiments, any other suitable data format and data elements may be utilized.

Figure 7:
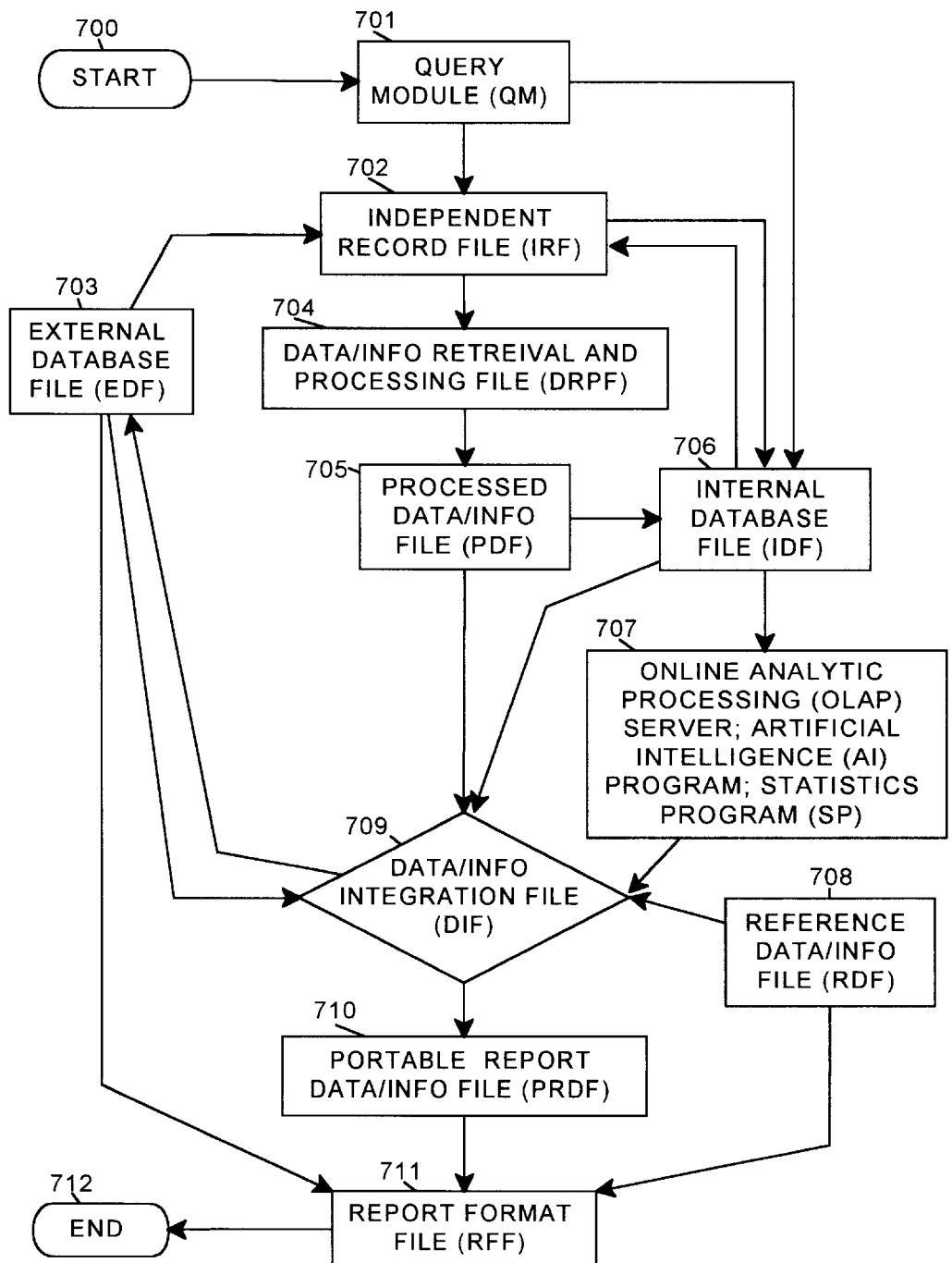
FIG. 7 illustrates an operational flow diagram of the possible directions of data and information flow of the present invention.

At step 216 the CPU 2, via programming code of the DCCM 24, stores each validated DU 80 as digital signals in at least one "internal database file" (IDF) 100. Note that this step is also indicated in FIG. 7 by the arrow pointing from step 702 to 706. While the IRF 40 contains the DUs 80 of a single entity, the IDF 100 contains DUs 80 of a plurality of entities structured in a manner similar to the plurality of records in a conventional database or multidimensional database. The records comprising the IDF 100 may also be interconnected by electronically linking at least one of the DRs 84 and/or PRs 88 of specified IRFs 40 to at least one of the DRs 84 and/or PRs 88 of other specified IRFs 40 that have the same QIIDs 44.

Note that one or both of the steps 215 and 216 need be utilized by the present invention; either, but not both, can be disregarded (bypassed, skipped over). That is, the DRs 84 and PRs 88 must be stored in either the IRF 40 or IDF 100, or they can be stored in both.

Also note that error correction routines may be employed by which the CPU 2, via programming code of the DCCM 24, is instructed to replace specific information and/or data that has been previously stored in the IRF 40 or IDF 100 with new information and/or data entered into the input device 5.

Returning to FIG. 3, the aforedescribed IDF 100 is at block 302F. The IDF 100 comprises:

a "table record" (TR) 104 at block 302G, which is comprised of at least one of the DUs 80 of a single entity that has been stored in the IDF 100 as a single record;

an "extended table record" (ETR) 144 at block 302H (described at a later point below); and an "aggregate data/info unit" ADU 146 at block 302I (also described at a later point below).

Returning once again to FIG. 2, at step 217 the CPU 2, via programming code of the DCCM 24, reads the aforedescribed branching logic code (BLC) 112 which is illustrated at block 501D (FIG. 5), the branching criterion (BC) 116 which is illustrated at block 501E (FIG. 5) and the branch-to location (BTL) 120 which is illustrated at block 501F (FIG. 5) of the QIH 36. The BLC 112 is comprised of navigation instructions that direct the CPU 2 where to focus after the user inputs a valid response. In the preferred embodiment, BLC 112 includes alphanumeric code instructing the CPU 2 to go to:

the next QI 32 in the QM 28 regardless of the previous valid response;

the QI 32 specified by the associated BTL 120 regardless of the previous valid response;

the QI 32 specified by the associated BTL 120 if the previous valid response is greater than the associated BC 116;

the QI 32 specified by the associated BTL 120 if the previous valid response is less than the associated BC 116; or the QI 32 specified by the associated BTL 120 if the previous valid response is equal to the associated BC 116.

In addition, the BLC 112 instructions above can combined using Boolean logic elements including the operators "and", "or", "not", "if", "then", and "except".

At step 218 the CPU 2, via programming code of the DCCM 24, focuses on the QI 32 which is indicated by the branching logic resulting from the process of step 217. Note that steps 217 and 218 are optional since there is no requirement that the QM 28 contain QUs 30 that utilize the aforedescribed branching process. At step 219 the electronic DCM 20 method ends unless there is at least one additional QU 30 in the QM 28. If at least one additional QU 30 exists, the process loops back to step 205 and repeats.

Whereas the above describes the electronic DCM 20 method of the preferred embodiment of the present invention, an alternate embodiment is comprised of the nonelectronic DCM 20 method. In this alternate embodiment, at least one element of information and/or data is obtained via nonelectronic means, such as by using paper questionnaires, surveys, and other suitable nonelectronic means for obtaining data and information. The nonelectronic DCM 20 utilizes one or a plurality of nonelectronic QIs 32, each associated with the nonelectronic QIID 44 and RII 56. Data and information obtained using the nonelectronic DCM 20 method can be input into the apparatus 1 via the input device 5, using an optical scanner, keyboard or other suitable input device. This is input process is similar to step 215 (FIG. 2) of the preferred embodiment, except that both valid and invalid DUs 80 are stored in the apparatus 1 and, further, different input means may be used.

The nonelectronic DCM 20 method is comprised of additional steps which are similar to the electronic DCM 20 method. Returning to FIG. 2 at step 213, since each DR 84 and PR 88 are converted to digital signal form upon being input into the apparatus 1, the format of each DR 84 and PR 88 can be validated by the CPU 2, via programming code of the DCCM 24. This format validation process is comprised of instructing the CPU 2 to compare the formats of all input DRs 84 and PRs 88 to criteria which are based on associated RIIDs 72. Thus, code of the DCCM 24 of the nonelectronic DCM 20 may instruct the CPU 2 to identify each DR 84 and PR 88 that fails to have the proper format for the RIID 72 with which it is associated. For example, if at step 214 the RIID 72 instructs the end user to respond with a "yes or no", but the user's DR 84 is "Disagree", then the CPU 2 may present a warning indicator via any suitable means that the DU 80 is invalid (such as by displaying its QIID 44 in a list of invalid responses presented on the presentation device 6). The CPU 2 may also delete the invalid DU 80. Unlike the electronic DCM 20 method, however, an invalid DU 80 does not return the process to step 212.

Step 216 is also similar in both the electronic DCM 20 and nonelectronic DCM 20 methods. Steps 217, 218, and 219, however, are not components of the nonelectronic DCM 20 method. Instead, when branching is utilized, the user must be informed of the specific BC 116 and BTL 120 instructions associated with each QI 32, such as by indicating branching instructions in print next to the QI 32 when a written questionnaire is used (e.g., an instruction may say, "If you answered YES to this question, skip the next three questions.").

Thus far, the electronic DCM 20 method of the preferred embodiment and the nonelectronic DCM 20 method of the alternate embodiment of the present invention have been described. The DCM 20 methods describe how data and information, comprised of DRs 84 and PRs 88, are acquired and stored (i.e., compiled) in the present invention.

A hypothetical example of the electronic DCM 20 method follows. This example illustrates the use of the electronic DCM 20 to obtain data and store them in the IRF 40 and IDF 100. In this example, a computer apparatus 1 is used to assess mathematical (computational) skills in a student over time (i.e., longitudinally) utilizing QM 28 number "1115". In this example, the entire DCM 20 process below is repeated at two different points in time, using the same QM 28 with the same student. The first time the QM 28 is utilized is the "initial assessment" and the second time is the "final assessment".

Referring to FIG. 2, the evaluator (i.e., the person evaluating the student) types in "1115" in the computer keyboard input device 5 at step 201 and then types in the student's social security number at step 202. The CPU 2, via programming code of the DCCM 24:

encrypts the social security number, returning the alphanumeric string "A77H49";

names the IRF 40 "A77H49.001" for the initial assessment and "A77H49.002" for the final assessment at step 203; and locates QM 28 number 1115 at step 204.

The QM 28 in the present example is comprised of one hundred QUs 30. The QUs 30 are arranged in a sequential order in which every ten QUs 30 refer to the same computational process, but no two groups refer to the same computational process (e.g., the first ten QUs 30 are addition problems, the second ten are subtraction problems, etc.).

The CPU 2, via programming code of the DCCM 24, then:

reads the QIH 36 of the first QU 30 at step 205;

at step 206 it writes the QIID 44 to the presentation device 6;

at step 207 it reads the QI 32;

at step 208 it writes the QI 32 to the presentation device 6, in a bold, centered, Arial 12 point font format, as indicated by the QIFC 48, thereby presenting a computational problem on the computer monitor;

at step 209 it reads the RIC 64;

at step 210 it searches the RIH 60 for a match between the RIID 72 and RIC 64;

at step 211 it writes the RII 56 to the presentation device 6, in a bold, centered, Arial 12 point font format beneath the QI 32 as indicated by the RIFC 76, which instructs the student to type on the keyboard the answer to the QI 32 or type "DK" if he does not know the answer, and then writes the input prompt, comprised of a one inch line below to the presentation device 6, as indicated by the IPC 78.

The student then responds to the QI 32 by typing in his DR 84 at step 212. At step 213 each DR 84 is checked (validated) by the CPU 2 via programming code of the DCCM 24 and the RVC 92 to ensure it is either a numeral or the letter "DK". If the DR 84 is invalid the CPU 2, via programming code of the DCCM 24, sounds a warning beep and the DR 84 is deleted at step 214. At step 215 the CPU 2, via programming code of the DCCM 24, saves each validated DR 84 and its associated QIID 44 as the DU 80. These validated DUs 80 are saved in an initial or final assessment IRF 40 (which ever is appropriate) within storage device 8. The IRF 40 is in ASCII tabbed-delimited format with the QIID 44 to the left and its associated DR 84 single-tabbed to its right. At step 216 the CPU 2, via programming code of the DCCM 24, saves each DR 84 and its associated QIID 44 (as its field) as an element in the TR 104 in a table in a Microsoft Access IDF 100 in storage device 8. The TR 104 is assigned the ID number A77H49 as the primary key. The initial assessment DRs 84 are saved in one table and the final assessment DRs 84 in a second table.

To make the presentation of QUs 30 more efficient, the CPU 2, via programming code of the DCCM 24, executes a branching routine at step 217 and 218. The branching routine utilizes the BLC 112, BC 116 and BTL 120 in the QIH 36 of every tenth QU 30 (beginning with the first) to instruct the CPU 2 to skip the following nine QUs 30 if the student's DR 84 is "DK" and then resume with the next QU 30 (e.g., if "DK" is the DR 84 to QU 30 number 20, then the next QU 30 to be presented would be number 30). Steps 205 through 218 are repeated until the QM 28 is completed. Note that this hypothetical example will hereinafter be referred to as the "computational skill example". Further description of this example will be postponed until it is continued at a later point below. Attention is now turned to describing how the method of the present invention processes at least one element of information and/or data and generates reports.

Figure 6:
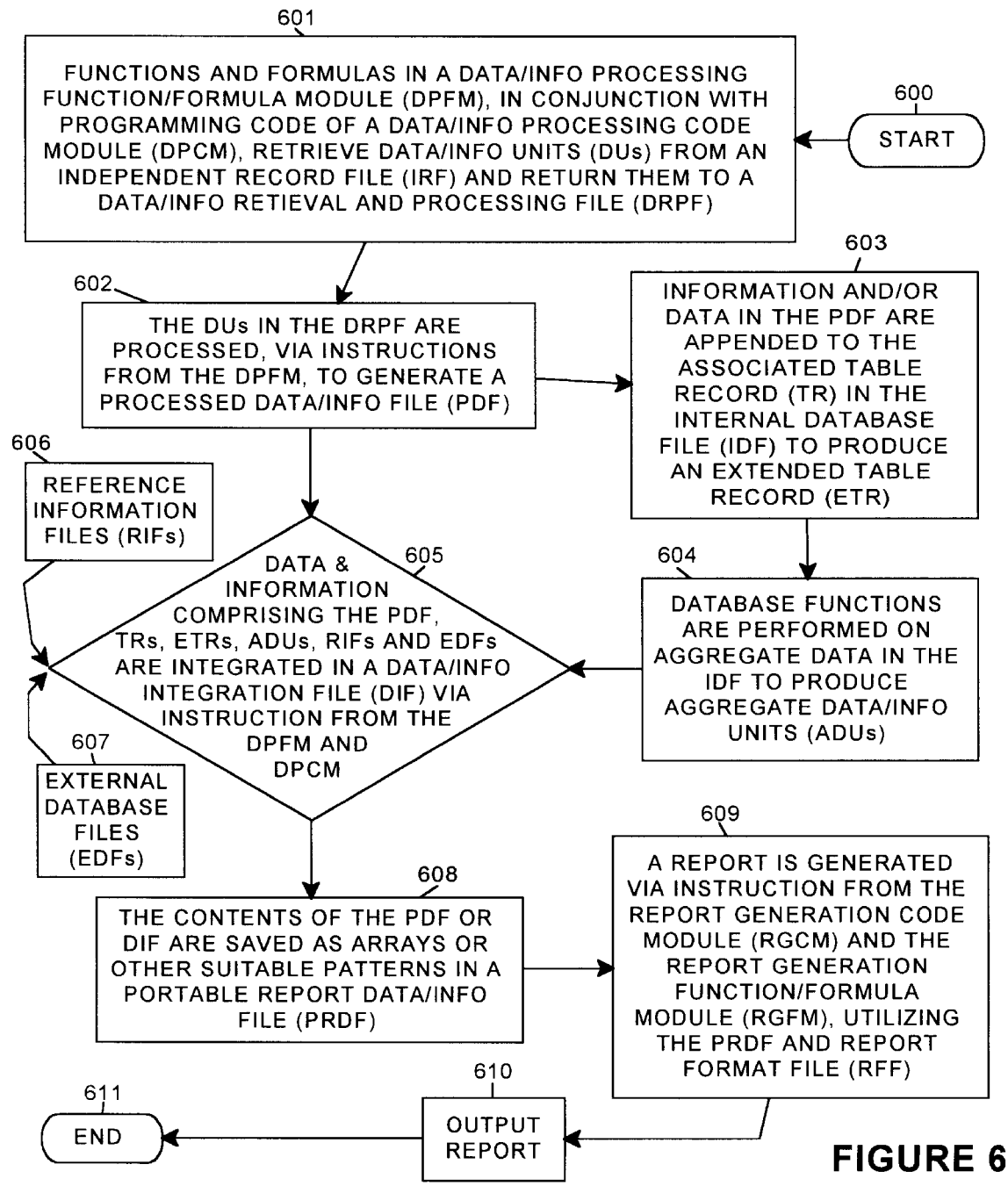
FIG. 6 illustrates an operational flow diagram of the data/information processing and report generation steps of method of the present invention.

FIG. 6 illustrates an operational flow diagram of the steps of the method used in the present invention to process at least one element of information and/or data and to generate reports (i.e., the "processing and reporting method"). The processing and reporting method, which is initiated at step 600, is utilized to process and report at least one element of information and/or data compiled via the electronic DCM 20 and nonelectronic DCM 20 methods. The data and information processing component of the processing and reporting method utilizes a "data/info processing module" (DPM) 124. Note that if the DCM 20 method is not utilized and, instead, information and/or data are obtained via a different method and stored in other than the IRF 40 or IDF 100, then steps 601 through 604 are skipped, and the process resumes at step 605 (as will be described at a later point below).

Returning again to FIG. 3, the DPM 124 is at block 303. The DPM 124 comprises:

- a "data/info processing code module" (DPCM) 128 at block 303A;
- a "data/info processing function/formula module" (DPFM) 132 at block 303B;
- a "data/info retrieval and processing file" (DRPF) 136 at block 303C;
- a "processed data/info file" (PDF) 140 at block 303D; and
- a "data/info integration file" (DIF) 154 at block 303E.

The DPCM 128 is comprised of one or a plurality of files containing programming code that operate the DPM 124 via instructions to the CPU 2. The programming code may be written in any suitable programming language. The DPFM 132 is also comprised of one or a plurality of files containing a single function and/or formula or a plurality of function and/or formulas that give the CPU 2 instructions for processing at least one element of information and/or data. The functions and formulas utilized by the DPFM 132 may include financial, mathematical, trigonometry, statistical, logical, lookup, reference, text, database, date and time, and all other functions and formulas utilized by a computer processing text and/or images and/or sounds and/or numbers.

Returning to FIG. 6, at step 601, the CPU 2, via programming code of the DPCM 128 and formulas and/or functions of the DPFM 132, retrieves DUs 80 from the IRF 40 and return them to the DRPF 136. The DRPF 136 is a file containing DPFM 132 formulas and/or functions which are utilized, in conjunction with DPCM 128 code, to retrieve and processes the DUs 80 from the IRF 40. The retrieval process can be accomplished by referencing, copying, importing, "linking" (i.e., making digital signal connections between elements) and/or by using any other suitable means for accessing or linking to DUs 80 from within the IRF 40. Note that this process is also indicated in FIG. 7 by the arrow pointing from step 702 to step 704.

At step 602 the CPU 2, via programming code of the DPCM 128 and formulas and/or functions of the DPFM 132, performs the specified formula and/or function routines on the retrieved DUs 80 in the DRPF 136. These formulas and/or functions perform at least one of the following routines on at least one element of the data or information: mathematical analyses, logical analyses, format modification, arrangement into specified formations, and any other suitable analysis and organization formulas and/or functions. If desired, a suitable spreadsheet program can utilize a single spreadsheet or plurality of linked (interconnected) and/or independent spreadsheets to perform these formula and/or function routines.

The formula and/or function routines generate one or a plurality of PDFs 140. The PDF 140 is a file comprised of one or a plurality of information and/or data elements retrieved by the DRPF 136 at step 601 and processed by the DRPF 136 at step 602. Note that this process is also indicated in FIG. 7 by the arrow pointing from step 704 to step 705. The information and/or data elements in the PDF 140 are arranged in horizontal and vertical grid-like formations (such as a continuous tic-tac-toe design) and/or other suitable formations. The actual location, format, and content of the information and/or data elements are determined by formulas and/or functions in the DRPF 136 and code in the DPCM 128. DRPF 136 templates may be utilized in which the formulas and/or functions are organized into predetermined formations. These formations facilitate information and/or data processing and reporting, as discussed below. The values comprising these formations are saved to a one or plurality of PDFs 140, which serve as an intermediate means of data/information formation storage and a convenient and efficient means for transmission of the data/information formations. The PDF 140 can be stored in any format that preserves the data/information formations and can be assigned any name that enables the file to be later accessed and its contents retrieved for further processing.

The computational skill example above will again be used to illustrate the data/information retrieval, analysis, and formation routines of the processing and reporting method of the present invention. Upon completion of the DPM 124 at step 601 the CPU 2, via programming code of the DPCM 128 and formulas and/or functions of the DPFM 132, retrieves the DUs 80 from the student's IRFs 40 and returns them to the DRPF 136. In this example, the DPCM 128, DPFM 132, DRPF 136 are all contained in a Microsoft Excel "workbook", which is comprised of at least one of spreadsheets, macros, and Visual Basic modules that are saved as a single file in storage device 8. The DUs 80 are retrieved using a Visual Basic copy command from the DPCM 128 and lookup and reference formulas and/or functions of the DPFM 132. Note that since Visual Basic commands and Excel functions and formulas are generally known to persons skillful in Visual Basic and Excel spreadsheet programming, and since there may a plurality of suitable ways in which the code, functions, and formulas may be written, the specific alphanumeric content and structure will not be described in detail herein.

The commands, functions, and formulas instruct the CPU 2 to open and activate the initial assessment IRF 40 (named A77H49.001) and the final assessment IRF 40 (named A77H49.002), to retrieve the DUs 80 and QIIDs 44 from the IRFs 40, and to a arrange them into a three-column array in a specific, logically determined location in the DRPF 136 spreadsheet.

The first column of the array contains the QIIDs 44 of each DU 80, each QIID 44 in a subsequent, adjacent row. Note that each QIID 44, DU 80, and Excel formula and/or function in the spreadsheet are located at an intersection between a row and column, in what is known in spreadsheet terminology as a "cell". The cells in the second (adjacent) column contain the DRs 84 from the initial use of the DCM 20, each DR 84 in a cell adjacent to its associated QIID 44. In the third column (adjacent to the initial DRs 84) are the DRs 84 obtained via the final (second) time the DCM 20 was used. The DUs 80 in the DRPF 136 are processed at step 602, via programming code of the DPCM 128 and formulas and/or functions of the DPFM 132, thereby generating the PDF 140, which is also an Excel spreadsheet. Following is a detailed description of this processing routine as it applies to the present example.

A fourth, fifth, and sixth column of cells have been previously entered into the DRPF 136 spreadsheet as a template for arranging and processing the DUs 80 retrieved above. The fourth column of cells, which are adjacent to the third, contain the correct answer for each DU 80 in numeric form. Cells in the fifth column, which are adjacent to the fourth, contain an Excel formula that instructs the CPU 2 to compare each initial DR 84 to its corresponding correct answer and, if they are equal, to return the value of "1" in that cell, or else to return a zero. Cells in a sixth column, adjacent to the fifth, contain Excel functions that instruct the CPU 2 to compare each final DR 84 to its corresponding correct answer and, if they are equal, to display the value of "1" in that cell, or else to display a zero. Cells at the bottom of fifth and sixth columns are comprised of Excel formulas that instruct the CPU 2 to compute and return the sum total of each respective column, which represent the total number of correct initial and final DRs 84, respectively. A cell to the immediate right of the cell with the final correct sum total contains an Excel formula that instructs the CPU 2 to subtract the initial sum from the final sum to return an "actual change score" value. A positive value in the change score cell indicates an improvement in computational skill over the time period between the initial and final assessments and a negative value indicates worsening of the skill. Next, the values in the DRPF 136 are saved as an Excel spreadsheet PDF 140 via a Visual Basic driven Excel "copy-paste special-values" function. Further description of this example will be postponed until it is continued below.

Returning to FIG. 6, at step 603, which is an optional step, the CPU 2, via programming code of the DPCM 128, appends and/or links some or all of the information and/or data in the PDF 140 to the aforedescribed TR 104, in an aforedescribed IDF 100 to which it is associated. This process is also indicated in FIG. 7 by the arrow pointing from step 705 to step 706. This routine adds processed information and/or data to the DRs 84 and PRs 88 in the IDF 100 to produce the ETR 144. The ETR 144 is analogous to a record in a table in a database in which the record's fields are comprised of at least one DR 84, PR 88, and an element of information and/or data processed by the PDF 140. The single ETR 144 may be comprised of appended information and/or data elements in the single IDF 100 table or it may be comprised of a plurality of "joined" tables (joined tables are electronically associated or interconnected using a primary key field to relate them to one another, thereby enabling the information and/or data elements of each table to be brought together so actions can be performed on them as though they are a single table). Note that if step 603 is skipped, the process immediately goes to step 605.

At step 604, which is also an optional step, the CPU 2, via programming code of the DPCM 128 and formulas and/or functions of the DPFM 132, performs database calculations (which may include sums, averages, minimums, maximums, counts, standard deviations, variances, and other suitable calculations), groupings, filters, sorts, queries, and other suitable database analysis functions and formulas utilizing two or more ETRs 144 and/or TRs 104 within the IDF 100 or a plurality of linked IDFs 100. If desired, a suitable database program can be utilized to performs these database formulas and functions. The database formulas and/or functions produce one or a plurality of ADUs 146, which are comprised of information and/or data elements that can be used to determine percentile ranks, ranges, frequency distributions, and other suitable statistical and mathematical data and information. Note that the statistical and mathematical computations that generate ADUs 146 provide a means by which to determine and utilize a plurality of "norms", which are values representing standards, models or patterns regarded as typical for a specified set of conditions.

The database processing routines in step 604 may be executed:

every time any new ETR 144 is produced;
every time a specific new ETR 144 is produced;
every time a specific plurality of new ETR 144 are produced;
at any other suitable interval of time; or
when the criteria of any other suitable condition is met.

The IDF 100 referred to in steps 603 and 604 is also indicated in FIG. 7 at step 706. An additional optional step that may follow step 604, which is not shown in FIG. 6, is instead indicated in FIG. 7 as step 707. Step 707 indicates the utilization of an aforedescribed online analytic processor (OLAP), aforedescribed artificial intelligence (AI) program, and any suitable statistics program (SP) such as SPSS (by SPSS, Inc.) and EQS (by Multivariate Software, Inc.). These data and information analysis routines access IDF 100 data, analyze them and, as indicated by the arrow pointing from step 707 to step 709, return the results of their analyses to one or a plurality of DIFs 154 as described below. Note that even though only OLAPs, AI programs, and statistics programs are indicated in FIG. 7 at step 707, any current or future technology that accesses data from databases, analyzes and/or organizes them, and produces information suitable for inclusion in the DIF 154 may be utilized at this step in the present invention. Note also that these data and information analysis routines can also be utilized to generate "factor profiles" which indicate correlated groupings of data via factor analysis and similar statistical procedures and can be used to reduce complex data into a smaller number of meaningful concepts.

Step 605 is an additional optional step if the DCM 20 is utilized and a necessary step if the DCM 20 is not utilized. At step 605 the CPU 2, via programming code of the DPCM 128 and formulas and/or functions of the DPFM 132, integrates (merges, combines) information and/or data comprising the PDFs 140 with any combination of information and/or data from:

(a) one or a plurality of the aforedescribed TRs 104;
(b) one or a plurality of the aforedescribed ETRs 144;
(c) one or a plurality of the aforedescribed ADUs 146;
(d) one or a plurality of "reference data/info files" (RDFs) 152 at step 606; and
(e) one or a plurality of "external database files" (EDFs) 156 at step 607.

This data and information integration routine proceeds within one or a plurality of DIFs 154. The DIF 154 is a file comprised of one or a plurality of grid-like structures or other suitable structures in which at least two elements of information and/or data can be integrated by arranging their locations to form unified patterns. The DIF 154 may be comprised of the actual DPFM 132 formulas and/or functions and/or may receive the values resulting from formulas and/or functions located in different DPFM 132 files via copying and/or linking commands of the DPCM 128. If desired, a suitable spreadsheet program can utilize algorithms in a single spreadsheet or plurality of linked (interconnected) and/or independent spreadsheets, along with suitable programming code, to organize the information and/or data into suitable patterns.

Returning to FIG. 3, a "supplemental data/info module" (SDM 150), illustrated at block 304, is comprised of the RDF 152 at block 304A (and step 708 in FIG. 7) and the EDF 156 at block 304B (and step 703 in FIG. 7). RDFs 152 and EDFs 156 may be stored in the storage device 8 of the apparatus 1 in which the DIF 154 is located and/or in external electronic storage device connected to the apparatus 1 via a LAN or WAN.

The RDF 152 is a file comprised of information and/or data in digital signal form that is related to at least one element of information and/or data in the PDF 140 or its associated IDF 100 (if one is utilized). The RDF 152 may comprise one or plurality of electronic tables, "electronic libraries" or any other suitable means for storing and retrieving data and information. Unlike typical databases which contain only data elements and/or small units of information, RDFs 152 can be comprised of more elaborate forms of information such as paragraphs or pages of text and relatively complex graphics, as well as tables of data elements.

The EDF 156 is any type of database "external" to the present invention (i.e., a remote database). That is, EDFs 156 are comprised of information and/or data not compiled by the DCM 20 method. The information and/or data in the EDF 156 can be stored in databases, spreadsheets, and any other suitable form of storage. EDF 156 information and/or data can be retrieved and returned to specified locations in the DIF 154 via any suitable programming code of the DPCM 128 and formulas and/or functions of the DPFM 132. If desired, programming code, such as "standard query language" (SQL), can be utilized to retrieve specific information and/or data elements from the EDF 156, and spreadsheet reference formulas and/or functions can be utilized to position the elements in specific locations in a spreadsheet. Note that step 607 is also indicated in FIG. 7 by the arrow pointing from step 703 to 709. Also note that information and/or data from the DIF 154 can be added to the EDF 156, via any suitable programming code of the DPCM 128 and formulas and/or functions of the DPFM 132, as indicated in FIG. 7 by the arrow pointing from step 709 to 703.

If the DCM 20 method is not utilized and, instead, information and/or data obtained via a different method are stored in the EDF 156, any record or records in the EDF 156 may be converted to the IRF 40 by instructing the CPU 2, via at least one of programming code of the DPCM 128 and formulas and/or functions of the DPFM 132, to query, copy, link, or use other suitable routines to put selected information and/or data elements and their associated field definitions from that record into a single digital signal file. The file can then be saved to storage device 8 with a name that identifies to whom the record belongs and the file can then be utilized as the IRF 40. If, on the other hand, the DCM 20 method is utilized to construct the IRF 40, a similar EDF 156 to IRF 40 conversion process may be utilized to append information and/or data from the EDF 156 to the IRF 40.

The EDF 156 to IRF 40 conversion is illustrated in FIG. 7. At step 701 the aforedescribed QM 28 is utilized to acquire information and/or data. At step 702, the QM 28 saves the information and/or data in the IRF 40. At step 703, the arrow pointing from step 703 to step 702 indicates the EDF 156 to IRF 40 conversion process as described above, while the arrow pointing from step 703 to step 709 indicates the aforedescribed integration of EDF 156 data into the DIF 154 (as depicted at step 607 of FIG. 6). Note that if the DCM 20 method is not utilized, the initial step is 703 and the next step is 702.

An additional database to IRF 40 conversion process is available when the DCM 20 method is utilized. This process involves storing the information and/or data acquired via the DCM 20 method in the aforedescribed IDF 100 and putting selected information and/or data elements and their associated field definitions from one or more specified records into a single digital signal file utilizing a routine similar to the EDF 156 to IRF 40 conversion process described immediately above. The file can then be saved to storage device 8 with a name that identifies to whom the record belongs and the file can then be utilized as the IRF 40. This process is illustrated in FIG. 7 by the arrow pointing from step 706 to step 702.

The above hypothetical "computational skill example" will now be elaborated upon to illustrate how to utilize Microsoft Excel and Access programs to:

(a) add the DRs 84 from the IRF 40 to the TR 104;
   (b) produce ETRs 144 by adding data from the PDF 140 to an associated TR 104;
   (c) produce ADUs 146 from the ETRs 144; and
   (d) integrate the data and information that comprise the PDF 140, ETR 144, ADU 146, RDF 152, and EDF 156 via the DIF 154.

The process begins by using Visual Basic code to copy the DRs 84 stored in the student's initial assessment IRF 40 to their associated fields in the TR 104 in a table named "initial assessment" in a Microsoft Access IDF 100 as per step 215 (in FIG. 2) and the arrow pointing from step 702 to step 706 (in FIG. 7). In addition, the DRs 84 stored in the student's final assessment IRF 40 are copied in the same manner to their associated fields in the TR 104 in a table named "final assessment" in the same Access IDF 100. Next, as per step 603 (in FIG. 6) and the arrow pointing from step 705 to step 706 (in FIG. 7), Visual Basic code is used to copy the initial and final assessment total correct values and the actual change score value from the student's PDF 140 to a third table named "totals" in the same IDF 100. Note that the student's records in the three tables have the student's ID number (A77H49) as the primary key. Furthermore, the tables are linked via standard Access table-linking functions, thereby producing the ETR 144. Note that in this example, ETRs 144 from a plurality of students have previously been added to the IDF 100 tables.

At step 604 (in FIG. 6) the IDF 100 totals and actual change score table are analyzed statistically via Access query calculations to yield aggregate means (averages) and standard deviations for the two total correct values and the actual change score value of all the students aggregated together. These calculated values comprise the ADUs 146.

At step 605 the DIF 154, comprised of a Microsoft Excel workbook file, is used to integrate a plurality of sources containing data and information. To begin, Visual Basic code and Excel formulas and functions in the DIF 154 instruct the CPU 2 to copy the PDF 140 values to a spreadsheet in the DIF 154 named "DATA". Further Visual Basic code and Excel formulas and functions then drive the following process to expand the aforedescribed six column array of the PDF 140 which now resides in the DATA spreadsheet.

First, the ADUs 146 calculated above are imported to the DIF 154 DATA spreadsheet from the IDF 100 using Excel's "get external data" process, which utilizes an "open database connectivity" (OBDC) driver, "dynamic data exchange" (DDE) mechanisms, and SQL code. This process places the:

(a) aggregate mean value of the initial assessment total correct score in the DIF 154 DATA spreadsheet cell immediately below the initial total score;
   (b) standard deviation value of the initial assessment total correct score in the cell immediately below its aggregate mean value;
   (c) aggregate mean value of the final assessment total correct score in the cell immediately below the final total score;

(d) standard deviation value of the final assessment total correct score in the cell immediately below its aggregate mean value;

(e) aggregate mean value of the actual change score in the cell immediately below the final total score; and (f) standard deviation value of the actual change score in the cell immediately below its aggregate mean value.

Excel formulas and/or functions located immediately below the standard deviation cells then instruct the CPU 2 to calculate z-scores (a statistic used to calculate percentile rankings, which computes the difference of an individual score from its aggregate mean in terms of standard deviation units) by:

(a) subtracting the initial and final assessment total correct score values from their respective aggregate means; and (b) dividing each difference value by its respective standard deviation value.

Next, Excel lookup functions in cells in the next row down search an RDF 152 z-score conversion table (used to convert z-scores to percentile rankings), which is located in another spreadsheet in the DIF 154 workbook, to match each z-score in columns five through seven and return the corresponding percentile value.

In addition, in the present example there is a hypothetical RDF 152 which is comprised of research-based information obtained via use of the DCM 20 to assess the effect of a mathematics enrichment program. The RDF 152 is a Microsoft Word document containing text describing the nature and implication of the research as well as an ASCII tab-delimited table of values indicating the average change score obtained at every level of initial total correct values. In the present example the student had an initial total correct value of 8 and final total correct of 12 for a gain of 4 points. According to the RDF 152 table, an average gain of 3 points for a student with an initial total correct value of 8 is expected following the enrichment program. Thus, the value of 3 points is the "expected change score." Using an Excel "object linking and embedding" (OLE) function, the aforedescribed ASCII tab-delimited table of values are continuously linked to a third spreadsheet in the DIF 154 workbook named "RDFLINK". And using an Excel lookup function, the expected change score value of 3 is returned from the RDFLINK spreadsheet to a specified cell in the DATA spreadsheet.

In addition, the EDF 156 comprised of other data about the student and other students is included in this example. The EDF 156 contains a primary field with each student's ID number and other fields indicating the student's age, grade level, sex, and IQ. Using Excel's aforedescribed "get external data" process, the student's age, grade level, gender, and IQ values are retrieved and returned to specified cells in the DATA spreadsheet. Further description of this example will be postponed until it is continued below.

Returning again to FIG. 6, at step 608 one or a plurality of"portable report data/info files" (PRDFs) 164 are saved to storage device 8 by the CPU 2 via programming code of the DPCM 128. Note that step 608 is also indicated in FIG. 7 at step 710. The PRDF 164 is comprised of at least one element of the information and/or data in the DIF 154 and/or PDF 140. For consistency of file names, the name of the PRDF 164 may be assigned the encrypted name of the IRF 40 (as per step 203 in FIG. 2), but with a different extension to avoid overwriting the IRF 40 with the PRDF 164, or the PRDF 164 may be assigned any other suitable name. The PRDF 164 may be saved in any suitable file format that maintains the data structures including, but not limited to, any suitable ASCII-delimited format such as comma or tab delimited. The PRDF 164 may also be compressed using any suitable compression process, such as PkZip, to reduce the amount of storage device 8 space needed to store it. Note that any files in the present invention may likewise be compressed in a suitable manner and decompressed prior to being utilized. Note that error correction routines may be employed by which the CPU 2, via programming code of the DPCM 128, is instructed to replace specific information and/or data that has been previously stored in the PRDF 164 with new information and/or data entered into the input device 5.

The PRDF 164 is a component of a "report generation module" (RGM) 160. The RGM 160, which is illustrated in FIG. 3 beginning at block 305, comprises:

(a) the aforedescribed PRDF 164 at block 305A;

(b) a "report generation code module" (RGCM) 168 at block 305B, which is described below;

(c) a "report generation function/formula module" (RGFM) 172 at block 305C, which is described below; and (d) a "report format file" (RFF) 176 at block 305D, which is also described below.

Returning again to FIG. 6, at step 609 the CPU 2 utilizes the information and/or data in the PRDF 164 to generate printed and electronic reports, via instructions from programming code of the RGCM 168 and formulas and/or functions of an RGFM 172. The RGCM 168 is comprised of one or a plurality of files containing programming code that operates the RGM 160 via instructions to the CPU 2. The programming code may be written in any suitable programming language. The RGFM 172 is also comprised of one or a plurality of files containing a single formula and/or function or a plurality of formulas and/or functions that give the CPU 2 specific instructions for processing at least one element of information and/or data used in generating a report. The formulas and/or functions utilized by the RGFM 172 may include financial, mathematical, trigonometry, statistical, logical, lookup, reference, text, database, date and time, and any other suitable formulas and/or functions performed by a computer. The formulas and/or functions of the RGFM 172 may be linked to and/or stored in one or a plurality of RFFs 176. The RFF 176 is a file, located in storage device 8 of the apparatus 1 of the present invention and/or in a suitable remote storage device, which may:

(a) contain the actual RGFM 172 formulas and/or functions; and/or (b) receive the values resulting from formulas and/or functions located in different RGFM 172 files via copying and/or linking commands of the RGCM 168; and/or (c) contain one or a plurality of pre-established templates of alphanumeric text and/or graphics and/or sound objects.

Note that the PRDF 164 provides and efficient means by which to transmit data and information in report ready form. Furthermore, since the PRDF 164 is independent of the RFF 176, the programming code, formulas, functions, alphanumeric text, graphics, and visual and sound objects in the RFF 176 may be modified at any time without adversely affecting the contents or structure of the PRDF 164. Thus, the PRDF 164 retains its integrity and usefulness even if it is:

(a) transferred out of the storage device containing the RFF 176; or (b) transferred from an external storage device (including a floppy disk, tape, LAN, WAN or any other suitable means for storing and transferring digital signal files) back to where the RFF 176 is stored.

Operating in conjunction with the RFF 176, the programming code of the RGCM 168 and formulas and/or functions of the RGFM 172 instruct the CPU 2 to generate output reports by presenting specified information and/or data from the PRDF 164 to the presentation device 6. The CPU 2 may, for example, be instructed to generate a report by:

(a) placing information and/or data from the PRDF 164 to specific locations in the RFF 176;

(b) sorting the information and/or data in the RFF 176 (e.g., alphabetically, numerically);

(c) filtering (i.e., hide) specific PRDF 164 information and/or data;

(d) preparing specific PRDF 164 information and/or data in graphic, pictorial, auditory form and/or any other suitable form;

(e) using specific font sizes, styles, and alignments, page and margin sizes, page headers and footers, and numeric format (e.g., number of decimal places to be displayed) in specified portions of an alphanumeric text;

(f) using specific colors and styles for the symbols used in graphs, still pictures, and videos;

(g) using specific volumes of sound objects; and/or (h) using any other suitable report generating processes.

Note that in addition to the information and/or data from the PRDF 164, information and/or data from any EDF 156 and RDF 152 may be retrieved and returned to the RFF 176 by the CPU 2 via programming code of the RGCM 168 and formulas and/or functions of the RGFM 172. While these routines are not shown in FIG. 6, they are indicated in FIG. 7, wherein:

(a) the arrow pointing from step 703 to step 711 indicates the placement of EDF 156 information and/or data into the RFF 176; and (b) the arrow pointing from step 708 to step 711 indicates the placement of RDF 152 information and/or data into the RFF 176.

At step 610, the CPU 2 via instructions from programming code of the RGCM 168, outputs the report generated at step 609 to the output device 7. The data and information processing and reporting routine terminates at step 611. Note that the report generation routine comprising steps 609 and 610 may be repeated any number of times to generate a plurality of reports utilizing at least one of:

(a) a plurality of different PRDFs 164 with a single RFF 176;

(b) a plurality of different RFFs 176 with a single PRDF 164;

(c) a plurality of different PRDFs 164 with a plurality of different RFFs 176; and (d) any of the three options above with the inclusion of information and/or data from one or a plurality of EDFs 156, one or a plurality of RDFs 152 or both.

The above hypothetical "computational skill example" will now be elaborated upon to illustrate how Microsoft Excel and Access programs can utilize the PRDF 164, RGCM 168, RGFM 172, and RFF 176 to generate and output a report. The routine involves a series of steps during which the CPU 2 utilizes instructions from Excel Visual Basic modules (which comprise the RGCM 168) and formulas and/or functions in Excel spreadsheets (which comprise the RGFM 172).

The process begins at step 608 as the CPU 2, via Visual Basic code, copies the values of select cells in the Excel "DATA" spreadsheet comprising the DIF 154 to a spreadsheet (assigned the name "A77H49") comprising the only spreadsheet in an Excel workbook (assigned the name "A77H49.XLS") which is saved as the PRDF 164. The cell values that are copied from the DIF 154 DATA spreadsheet cells to the PRDF 164 spreadsheet cells are:

(a) the total number of correct initial DRs 84 and the corresponding percentile rank;

(b) the total number of correct final DRs 84 and the corresponding percentile rank;

(c) the change score;

(d) the value of "3" referring to the average units of change following the enrichment research program; and (e) the student's age, grade level, sex, and IQ which were obtained from the EDF 156. The PRDF 164 is now complete.

At step 609 a report is generated utilizing the cell values in the PRDF 164 in conjunction with Visual Basic code comprising the RGCM 168, Excel spreadsheet formulas and/or functions comprising the RGFM 172 and an Excel workbook comprising the RFF 176. The description of this report generation process follows below.

The end user begins by typing, via the input device 5, the student's encrypted ID number in a cell in the first RFF 176 spreadsheet name "ID". The cell had been previously formatted with a line border around it and adjusted to a suitable height and width using Excel mouse and keyboard operations. In the cell to the immediate left the text "Please enter the student's ID number to the right and press Enter. Next, click on the START button below." When clicked with the mouse, the start button, which was previously created via the Excel "dialog sheet" and assigned a Visual Basic procedure, initiates the Visual Basic procedure that instructs the CPU 2 to:

(a) find and activate the PRDF 164 with the name "A77H49.XLS" from within the storage device 8 in which it is stored;

(b) copy the PRDF 164 spreadsheet values to a spreadsheet named "VALUES" in the RFF 176 workbook; and (c) retrieve the contents of the VALUES spreadsheet and return them to specified cells in another RFF 176 workbook spreadsheet named "REPORT" via use of linking formulas in the cells of the REPORT spreadsheet.

The resulting pattern of values in the RFF 176 REPORT spreadsheet, together with previously entered text in text label cells, comprise an alphanumeric text report. The content and structure of the REPORT spreadsheet is as follows:

The text label "Student's ID:", which was previously entered into the spreadsheet, is in the first cell (i.e., the cell to the extreme upper left) and the student's ID number is in the cell to its immediate right.

The text label "Today's Date:", which was previously entered into the spreadsheet, is in the cell beneath the "Student Student's ID:" label and a formula that returns the current date, which was also previously entered into the spreadsheet, is in the cell to its immediate right.

The text labels "Age:", "Grade:", "Gender:", and "IQ:", which was previously entered into the spreadsheet, are located in a single column with each label in a cell immediately beneath the one above it. The first label (i.e., "Age:") located two cells beneath the "Today's Date:" cell. The student's age, grade level, and IQ values are returned to cells the immediate right of their respective label cells.

In the cell two cells below the "IQ:" label is the previously entered text, "Mathematical Computation Evaluation Results", formatted in bold and underlined.

Beginning in the cell two cells below and one cell to the right of the "Mathematical Computation Evaluation Results" label cell is a cell with the text label "Percentile" and a cell to its right with the text label "Raw Score:".

The cell immediately below and one cell to the left of the "Percentile" text label cell is a cell with the text label "Initial Score:".

The cell immediately to the right of the "Initial Score:" text label cell contains a linking formula that returns from the cell in the VALUES spreadsheet the total initial correct percentile value.

The cell immediately to the right of the correct initial percentile value cell contains a linking formula that returns from the cell in the VALUES spreadsheet the total initial correct raw score value.

The cell immediately below the "Initial Score:" text label cell is a cell with the text label, "Final Score".

The cell immediately to the right of the "Final Score:" text label cell contains a linking formula that returns from the cell in the VALUES spreadsheet the total final correct percentile value.

The cell immediately to the right of the correct final raw score value cell contains a linking formula that returns from the cell in the VALUES spreadsheet the total final correct raw score value.

Two cells below and one cell to the right of the "Final Score:" text label cell is a cell with the text label "Actual Change Score:".

The cell immediately to the right of the "Actual Change Score:" text label cell is a cell containing a linking formula that returns from the cell in the Data spreadsheet the raw change score value.

The cell immediately below the "Actual Change Score:" text label cell is a cell with the text label "Expected Change:".

The cell immediately to the right of the "Expected Change:" text label is a cell containing a linking formula that returns from the cell in the Data spreadsheet the expected change score value.

The cell immediately to the right of the expected change score value contains a formula instructing the CPU 2 to subtract the expected change score value from the actual change score value and, if the difference between the two scores is:

(a) greater than 0 (zero), to return to the formula cell the text "Change Score is Above Expectations";

(b) equal 0 (zero), to return to the formula cell the text "Change Score is As Expected"; and (c) less than 0 (zero), to return to the formula cell the text "Change Score is Below Expectations".

The page setup for the REPORT spreadsheet is portrait orientation, adjusted to fit on one page wide by one page tall, with one inch margins and no gridlines, headers, nor footers. The width of the columns, height of the rows, and format of the cell contents are adjusted as necessary for suitable appearance.

In addition to the REPORT spreadsheet are two graphs. The graphs were previously designed by inserting graph sheets in the RFF 176 using the Microsoft Excel 5.0 pull-down menu "insert chart as new sheet" command and then following the instructions of the "ChartWizard".

The ChartWizard process for creating the first graph is as follows:

The "range" are those cells in the REPORT spreadsheet containing the text labels and corresponding values for the initial and final total percentiles.

The chart type is column.

The chart format is option "6" (i.e., includes a Y-axis grid).

The data series is in columns.

"1" is entered into the box indicating the column(s) to be used for labels.

"1" is entered into the box indicating the row(s) to be used for legend text.

"No" is indicated under "Add a Legend?".

The chart title is "Student Progress Chart".

The "category axis" title is "Evaluation Designation".

The "value axis" title is "in percentile points".

The ChartWizard process for creating the second graph is as follows:

The "range" are those cells in the REPORT spreadsheet containing the text labels and corresponding values for the change score and expected change score.

The chart type is column.

The chart format is option "6" (i.e., includes a Y-axis grid).

The data series is in columns.

"1" is entered into the box indicating the column(s) to be used for labels.

"1" is entered into the box indicating the row(s) to be used for legend text.

"No" is indicated under "Add a Legend?".

The chart title is "Actual versus Expected Change".

The "category axis" title is blank.

The "value axis" title is "in raw score units".

The page setup for charts is landscape orientation, scale to fit page, with one inch margins and no gridlines, headers, nor footers.

The contents of the aforedescribed REPORT spreadsheet and two charts comprise the three page report of the present example. The report may be viewed on a presentation device 6 and/or printed out via an output device 7. This concludes the use of the computational skill example to describe aspects of the present invention.

Conclusion, Ramifications, and Scope

Accordingly, the modular system of the present invention overcomes major limitations of conventional and multidimensional databases by providing a substantially more flexible and efficient structure by which to compile, process, transmit, and report data and information.

The modules of query and response instruction items utilized by the present invention can readily accommodate a multitude of varied and changing requests for a multitude of different types of information and/or data, thereby easily adapting to variable requests for data and information over time. Conventional and multidimensional databases are substantially less flexible, having a substantially more difficult time adapting and adjusting to end users changing needs.

The present invention can facilitate the compilation of information and/or data by utilizing a branching-logic process, thereby enabling a substantially larger number data and information elements to be compiled in a substantially briefer period of time than can conventional and multidimensional databases.

The independent record files utilized by the present invention enable a multitude of raw data to be stored in digital signal records containing substantially less sparseness and overhead than conventional and multidimensional databases, thereby requiring substantially less space to store them and substantially less time to transmit them via electronic means (e.g., LANS and WANS).

The independent record files utilized by the present invention can contain a multitude of data types in a single field and can have differing fields from record to record, thereby providing substantially greater flexibility and efficiency than provided by conventional and multidimensional database records.

Any of the modules of data and information, computer programming code, and digital signal functions and formulas utilized by the present invention can be readily modified without disrupting the structure or content of the other modules, thereby providing substantially greater flexibility, efficiency, and stability than provided by the rigidly structured, interdependent components of conventional and multidimensional databases.

The present invention can integrate and process a multitude of data and information from a multitude of sources to create a multitude of digital signal patterns which are saved in files utilized to generate reports. These digital signal patterns provide a substantially more flexible and efficient means for storing large quantities of complex data and information than by utilizing the linked tables of conventional databases or by utilizing multidimensional databases.

The present invention can utilize a multitude of report format files to generate customized reports comprised of a multitude of formats and contents. These reports can be produced with substantially greater ease, flexibility, and computing power than can conventional and multidimensional database reports.

While the method of the preferred embodiment of the present invention utilizes a computer apparatus and computer programming code, formulas, and functions to compile, process, transmit, and report data and information, the method need not utilize a computer nor computer programming code, formulas, and functions. Instead, the method may utilize any apparatus able to obtain, store, analyze, integrate, organize, and report at least one unit of information and/or data, whereby operational commands control the apparatus which utilizes electric, magnetic, electromagnetic, chemical, and/or other suitable forms of energy to:

(a) acquire information and/or data from living entities and/or from nonliving storage sources (e.g., databases);

(b) store the information and/or data in aggregate independent storage units (e.g., database files) and/or individual independent storage units (e.g., record files);

(c) analyze and/or integrate the information and/or data from one or a plurality of sources and organize them into portable formations able to be transmitted to different locations; and (d) generate output reports.

Although the descriptions above contains many specificities, these should not be considered as limiting the scope of the invention but as merely providing illustrations of some of the presently preferred and various alternative embodiments of the present invention. Accordingly, the present invention includes all modifications and/or variations of the embodiments described herein with the scope of the invention limited only by the claims which follow.

What is claimed is:

1. An apparatus with a modular structure for acquiring, storing, analyzing, integrating, organizing, transmitting, and reporting information and/or data and for presenting the information and/or data as digital signals, comprising:

(a) an electronic execution means providing control over said apparatus via instructions from at least one algorithm, stored in at least one file, comprised of at least one of computer programming code, macros, functions, and formulas;

(b) a user input means for entering commands providing further control over said apparatus, and for entering said digital signals and algorithms into said apparatus;

(c) a memory means for maintaining said digital signals in electronic and/or magnetic form;

(d) a data and information compilation means for acquiring and storing said digital signals;

(e) a storage means for storing at least one of said digital signals and algorithms;

(f) at least one independent record file and/or at least one internal database file providing a means for storing and transmitting said information and/or data referring to a single entity or occurrence;

(g) at least one processing file providing a means for processing said digital signals;

(h) at least one portable report file providing a means for storing and transmitting said digital signals in report ready format;

(i) at least one report format file providing a means for structuring report formats and retrieving information and/or data from external sources;

(j) a presentation means for providing an indication of said operation of said apparatus and for displaying said reports; and (k) an output means for outputting said reports;

whereby said modular structure provides a substantially flexible and efficient means by which to compile, process, transmit, and report data and information, including the ability to readily modify modules without disrupting the structure or content of the other modules; the ability to compile a multitude of data efficiently and with minimal sparseness and overhead; the ability to enter a multitude of data types in a single field; the ability to utilize independent record files with differing fields; the ability to track data and information longitudinally; the ability to integrate, analyze, and organize a multitude of data and information from a multitude of sources utilizing a multitude of algorithms and a multitude of data, information, and computer function and formula patterns; the ability to transmit raw and processed data and information in a substantially compact and efficient form; and the ability to generate, with substantial ease and flexibility, reports comprised of a multitude of formats and contents.

2. The apparatus of claim 1 wherein said data and information compilation means may utilize branching logic to facilitate the acquisition of said digital signals.

3. The apparatus of claim 1 wherein at least one data/information retrieval and processing file provides a means for retrieving and processing said digital signals from said independent record file and for storing the processed digital signals in at least one processed digital signal file.

4. The apparatus of claim 1 wherein at least one internal database file provides a means for storing said digital signals in database tables and processing said digital signals in said in database tables via conventional and/or multidimensional database methods, artificial intelligence methods, and statistical analyses.

5. The internal database file of claim 4 wherein said internal database file may be comprised of at least one of:
   (a) a table record, comprising a database record in a database table, which is comprised of at least one of said digital signal elements from said independent record file;
   (b) an extended table record, comprising a database record in a database table, which is comprised of at least one of said digital signal elements from said independent record file together with at least one digital signal elements from said processed digital signal file; and
   (c) an aggregate digital signal unit which is comprised of said digital signal elements aggregated via database calculations.

6. The apparatus of claim 1 wherein at least one digital signal integration file provides a means for integrating, into at least one unified pattern, at least two digital signal elements comprising at least one of:
   (a) said processed digital signal files;
   (b) said internal database files;
   (c) external database files comprising at least one element of information and/or data residing as digital signals in other than said processed digital signal files and said internal database files;
   (d) reference information files comprising at least one element of reference information in digital signal form that is related to at least one element of said digital signals in said processed digital signal files and/or said internal database files; and
   (e) the digital signal output from database analysis programs, which may be comprised of a program selected from the group consisting of online analytic processors with multidimensional databases, artificial intelligence programs, and statistical analysis programs.

7. The apparatus of claim 1 further comprised of a backup system which is comprised of:
   (a) an electronic execution means for controlling the apparatus via instructions of at least one algorithm;
   (b) a user input means for entering commands providing control over said apparatus and for entering information and/or data into the apparatus;
   (c) a memory means for maintaining said data and information in electronic and/or magnetic form;
   (d) a presentation means for providing an indication of said operation of said apparatus and for displaying said reports; and
   (e) an output means for outputting said reports;
   wherein said backup system provides a redundancy system for controlling the operation of the present apparatus and for storing, presenting, and outputting said digital signals.

8. The apparatus of claim 1 comprised of a user interactive means which is further comprised of:
   (a) a user input means;
   (b) a user display means; and
   (c) a user output means;
   wherein said user interactive means provides for remote accessing and utilization of said apparatus, and further wherein said user interactive means facilitates at least one of information and/or data entry, transmission and control over said apparatus, and further wherein output data may be obtained from said apparatus via said user output means, and further wherein said user interactive means may be interfaced with said apparatus by means of at least one of a telecommunication means, a radio communication means, and a satellite communication means, and may be utilized in one of a local area network and a wide area network.

9. A method utilizing modular processes for acquiring, storing, analyzing, integrating, organizing, transmitting, and reporting information and/or data, and for presenting the information and/or data as digital signals, comprising the steps of utilizing at least one algorithm comprised of at least one of computer programming code, macros, functions, and formulas for:
   (a) obtaining preexisting information and/or data from external databases;
   (b) obtaining new information and/or data utilizing electronic and/or nonelectronic means;
   (c) storing said preexisting and new information and/or data as digital signals in at least one independent record file and/or at least one internal database file;
   (d) processing said digital signals;
   (e) producing at least one portable report file; and
   (f) generating at least one output report indicative of said digital signals utilizing at least one report format file;
   whereby said modular process provides a substantially flexible and efficient means for compiling, processing, transmitting, and reporting data and information, including the ability to readily modified modules without disrupting the structure or content of the other modules, the ability to compile a multitude of data efficiently and with minimal sparseness and overhead, the ability to enter a multitude of data types in a single field, the ability to utilize independent record files with differing fields, the ability to track data and information longitudinally, the ability to integrate, analyze, and organize a multitude of data and information from a multitude of sources utilizing a multitude of algorithms and a multitude of data, information, and computer function and formula patterns, the ability to transmit raw and processed data and information in a substantially compact and efficient form, and the ability to generate, with substantial ease and flexibility, customized reports comprised of a multitude of formats and contents.

10. The method of claim 9, wherein the process for storing said preexisting information and/or data comprises converting said preexisting information and/or data from an external database into digital signals which are stored in at least one of said independent record files; and further wherein the process for storing said new information and/or data may comprise converting said new information and/or data from said internal database into digital signals which are stored in at least one of said independent record files.

11. The method of claim 9, wherein said process for obtaining new information and/or data via electronic means is comprised of the steps of utilizing:
   (a) at least one query item for obtaining information and/or data in digital signal form by presenting a request for said information and/or data via an electronic presentation device;
   (b) a query item header associated with each query item comprised of the steps of utilizing (c) a query item identifier for identifying said query item with a unique alphanumeric string;

(d) at least one query item format code, comprised of an alphanumeric string, for indicating the form in which the query item is presented;

(e) at least one response instruction code, comprised of an alphanumeric string, for indicating the type of response instruction associated with said query item;

(f) at least one branching logic code, comprised of an alphanumeric string, for indicating Boolean branching logic variables used to navigate the order of presentation of said query items;

(g) at least one branching criterion, comprised of an alphanumeric string, for use in conjunction with said branching logic code for defining branching logic conditions; and (h) at least one branch to location, comprised of an alphanumeric string, for use in conjunction with said branching logic code for defining the query item for presentation;

(i) at least one response instruction module comprised of at least one response instruction unit associated with each said query item comprised of the steps of utilizing (j) at least one response instruction item for presenting, via a digital signal presentation device, instructions indicating the manner in which said query item is to be answered;

(k) at least one response-instruction header associated with each response instruction item comprised of the steps of utilizing (l) at least one response instruction identifier, comprised of an alphanumeric string, for identifying said response instruction items;

(m) at least one response instruction format code, comprised of an alphanumeric string, for indicating the form in which the query item is presented;

(n) at least one input prompt code, comprised of an alphanumeric string, for indicating the format in which an input prompt is presented; and (o) at least one response validation code, comprised of an alphanumeric string, for indicating acceptable types of responses; or (p) said query items with their associated response-items combined within them for presenting said query items without utilizing said response instruction identifier and response instruction format code;

whereby substantial varieties and quantities of data and information can be acquired with substantial efficiency, and whereby substantial modifications can readily be made to the types of data and information acquired and to the manner in which said data and information are obtained.

12. The method of claim 9, wherein said process for obtaining new information and/or data via nonelectronic means is comprised of utilizing nonelectronic query items and response instruction items to obtain information and/or data which are converted to digital signals.

13. The method of claim 9, wherein said process for storing said preexisting and new information and/or data as digital signals in at least one independent record file can be repeated over time;

whereby said digital signals in said independent record files provide an efficient and effective means to track data and information longitudinally and to analyze them to determine historical trends.

14. The method of claim 9, wherein said process for processing said digital signals comprises the steps of:

(a) retrieving at least one element of said digital signals from said independent record file;

(b) performing at least one processing routine on said digital signals comprising at least one of a mathematical and/or logical analysis, formatting, and organizing of said digital signals; and (c) storing said processed digital signals in at least one processed digital signal file;

whereby said digital signals are transmitted and processed.

15. The method of claim 9, wherein a process for storing said digital signals in at least one internal database file comprises of the steps of storing said digital signals in:

(a) a table record, comprising a database record in a database table, which is comprised of at least one of said digital signal elements from said independent record file;

(b) an extended table record, comprising a database record in a database table, which is comprised of at least one of said digital signal elements from said independent record file together with at least one digital signal elements from said processed digital signal file;

whereby said digital signals are transmitted to and combined in database tables.

16. The method of claim 15, wherein said process for storing said digital signals in at least one of said internal database files further comprises an aggregate data/information unit which is comprised of said digital signals aggregated via database calculations.

17. The method of claim 9 wherein at least one digital signal integration file integrates, into at least one unified pattern, at least two digital signal elements comprising at least one of:

(a) said processed digital signal files;

(b) said internal database files;

(c) external database files comprising one element of information and/or data residing as digital signals in other than said processed digital signal files and said internal database files;

(d) reference information files comprising at least one element of reference information in digital signal form that is related to at least one element of said digital signals in said processed digital signal files and/or said internal database files; and (e) the digital signal output from database analysis programs, which may be comprised of a program selected from the group consisting of online analytic processors with multidimensional databases, artificial intelligence programs, and statistical analysis programs;

whereby said digital signals from a plurality of sources can be saved as patterns in a single file.

18. The method of claim 9 wherein said process for producing at least one of said portable report files is comprised of the steps of processing at least one digital signal element of at least one of said digital signal integration files and/or said processed digital signal files to produce at least one of said portable report files; and further wherein said digital signals in said portable report file are organized into one or a plurality of digital signal patterns and stored in one or a plurality of said portable report files;

whereby said digital signal patterns provide a flexible and efficient means for storing and transmitting digital signals used to generate a plurality of said output reports.

19. The method of claim 9 wherein the process for generating said output reports utilizing at least one of said report format file is comprised of the steps of:

(a) obtaining at least one element of said digital signals selected from the group consisting of said portable report files, said external database files, and said reference information files utilizing algorithms comprising said report format file;

(b) processing said digital signals utilizing formatting templates further comprising said report format file; and (c) generating reports by presenting at least a portion of said report format file templates and the processed digital signals therein to a presentation device;

whereby said report format file templates and said processed digital signals therein generate, with substantial ease, customized reports comprised of a multitude of formats and contents; and further whereby said reports can be comprised of digital signals from a plurality of sources; and further whereby said reports can present longitudinal as well as single occurrence data and information.

* * * * *

UNITED STATES PATENT AND TRADEMARK OFFICE
CERTIFICATE OF CORRECTION

Page 1 of 2

PATENT NO. : 5,852,819
DATED : December 22, 1998
INVENTOR(S) : Stephen E. Beller It is certified that error appears in the above-identified patent and that said Letters Patent is hereby corrected as shown below:

On the title page, item [57]:

Last word of the abstract, change "tiles" to —files—.

In Fig 4, page1, and in sheet 4 of the Figures, change reference numeral "40" to —401—.

Col. 11, line 41, change "QM 28" to —DCM 20—.

Col. 12, line 54, change "indicated at blocks 302, at block 302A" to —indicated at blocks 302 and 302A—.

Col. 15, line 56, change "stores each validated DU 80 as digital signals" to —stores validated DUs 80 as separate digital signals and/or contiguously as a partial or complete IRF 40—.

Col. 16, line 1, change "Note that one or both" to —Note that, when the DCM 20 method is utilized, one or both—.

Col. 16, line 20, change "3021" to —302I—.

Col. 17, line 5, change "This is input" to —This input—.

Col. 19, line 39, change "via programming code" to —via either or both programming code—.

Col. 19, lines 43 and 44, change "The DRPF 136 is a file containing DPFM 132 formulas and/or functions which are utilized, in conjunction with DPCM 128 code" to —The DRPF 136 is a file containing either or both DPFM 132 formulas and/or functions and DPCM 128 code—.

Col. 19, lines 52 through 57, change "At step 602 the CPU 2, via programming code of the DPCM 128 and formulas and/or functions of the DPFM 132, performs the specified formula and/or function routines on the retrieved DUs 80 in the DRPF 136. These formulas and/or functions perform at least one of the following routines" to —At step 602 the CPU 2, via either or both programming code of the DPCM 128 and formulas and/or functions of the DPFM 132, performs the specified routines on the retrieved DUs 80 in the DRPF 136. The following routines—.

UNITED STATES PATENT AND TRADEMARK OFFICE
CERTIFICATE OF CORRECTION

Page 2 of 2

PATENT NO. : 5,852,819
DATED : December 22, 1998
INVENTOR(S) : Stephen E. Beller It is certified that error appears in the above-identified patent and that said Letters Patent is hereby corrected as shown below:

Col. 19, line 64, change "from these formula and/or function routines" to —from these routines—.

Col. 19, line 65, change "The formula and/or function routines" to —The at least one of programming code and formula and/or function routines—.

Col. 23, line 28, change "sheet reference formulas and/or functions" to —sheet reference formulas and/or functions and/or other code—.

Col. 26, lines 27 and 28, change "via instructions from programming code" to —via instructions from at least one of programming code—.

Col. 27, line 31, change "by the CPU 2 via programming code of the RGCM 168" to —by the CPU 2 via at least one of programming code of the RGCM 168—.

Signed and Sealed this

Seventh Day of September, 1999

Attest:

Q. TODD DICKINSON

Attesting Officer

Acting Commissioner of Patents and Trademarks